United States Patent [19]
Sapir et al.

[11] Patent Number: 5,961,597
[45] Date of Patent: Oct. 5, 1999

[54] APPARATUS AND METHOD FOR DETECTING A LAYOUT OF A SWITCHED LOCAL NETWORK

[75] Inventors: Boaz Sapir, Tel Aviv; Rafael Horev, Ramat Gan; Sergei Kaplan, Rehovot; Amit Ramraz, Ashdod; Michael Shurman, Lev-Hasharon, all of Israel

[73] Assignee: Madge Networks (Israel) Ltd., Tel Aviv, Israel

[21] Appl. No.: 08/843,620

[22] Filed: Apr. 10, 1997

[30] Foreign Application Priority Data

Aug. 13, 1996 [IL] Israel ........................................ 119062

[51] Int. Cl.[6] ..................................................... G06F 17/00
[52] U.S. Cl. ............................................................. 709/224
[58] Field of Search ......................... 395/200.53, 200.54, 395/200.55; 345/329; 370/401; 709/224

[56] References Cited

U.S. PATENT DOCUMENTS

| | | |
|---|---|---|
| 5,297,138 | 3/1994 | Black ........................................ 370/401 |
| 5,421,024 | 5/1995 | Faulk, Jr. et al. ................... 395/100.75 |
| 5,598,532 | 1/1997 | Liron et al. ........................... 395/500.5 |
| 5,649,100 | 7/1997 | Ertel et al. .......................... 395/200.68 |
| 5,684,967 | 11/1997 | Mckenna et al. ................... 395/200.53 |

*Primary Examiner*—Ellis B. Ramirez
*Attorney, Agent, or Firm*—Ladas & Parry

[57] ABSTRACT

This invention discloses a method for detecting a layout of a switched local network including at least one switching hub connected to a first plurality of elements, each identified by an address, via a corresponding second plurality of ports defining a corresponding second plurality of element to port connections, the method including determining all element to port connections for each switching hub, identifying the elements which communicate via each of that switching hub's backbone ports and based on the element to port connections and the elements communicating via each switching hub's backbone ports, determining the layout of the switched local network.

An apparatus for monitoring a layout of a local network, the network including a first plurality of ports associated, via end-station to port connections, with a second plurality of end-stations is also disclosed.

48 Claims, 21 Drawing Sheets

APPARATUS AND METHOD FOR DETECTING A LAYOUT OF A SWITCHED LOCAL NETWORK

FIELD OF THE INVENTION

The present invention relates to apparatus and methods for detecting a layout of a network.

BACKGROUND OF THE INVENTION

Methods and apparatus for RMON switching hub monitoring are described in copending U.S. patent application Ser. No. 08/623,324, the disclosure of which is hereby incorporated by reference.

Methods and apparatus for determining the topology of a shared network are described in U.S. Pat. No. 5,226,120 to Brown et al.

The disclosures of all publications mentioned in the specification and of the publications cited therein are hereby incorporated by reference.

SUMMARY OF THE INVENTION

The present invention seeks to provide improved apparatus and methods for detecting a layout of a network.

There is thus provided, in accordance with a preferred embodiment of the present invention, a method for detecting a layout of a switched local network including at least one switching hub connected to a first plurality of elements, each identified by an address, via a corresponding second plurality of ports defining a corresponding second plurality of element to port connections, the method including determining all element to port connections, for each switching hub, identifying the elements which communicate via each of that switching hub's backbone ports, and based on the element to port connections and the elements communicating via each switching hub's backbone ports, determining the layout of the switched local network.

Further in accordance with a preferred embodiment of the present invention, each of the steps of determining and identifying includes, for each switching hub, the step of performing RMON switching hub monitoring.

Still further in accordance with a preferred embodiment of the present invention, the step of determining all end-station to port connections includes collecting information from each of the ports regarding end-stations which communicate via that port.

Further in accordance with a preferred embodiment of the present invention, the switched network includes an FDDI (fiber distributed data interface) ring and wherein the step of identifying includes the step of determining which switches are connected to the FDDI ring.

Also provided, in accordance with a preferred embodiment of the present invention, is a method for detecting a layout of a switched local network including at least one switching hubs connected to a plurality of end-stations via a corresponding plurality of ports defining a corresponding plurality of end-station to port connections, the method including categorizing each of the at least one switching hubs as leaf hubs, which are each linked to only one port of only one other hub, or as non-leaf hubs, and for each leaf hub, determining leaf hub information which includes the single port of the single hub to which the leaf hub is linked, and employing the leaf hub information in order to determine the layout of the non-leaf hubs in the switched local network.

Further in accordance with a preferred embodiment of the present invention, the step of determining the single port of the single hub to which a leaf hub is linked includes scanning all backbone ports in each of the hubs of the switched local network other than the leaf hub to determine which hubs received at least one message from the leaf hub and received no messages from any other hub, and if only a single backbone port is found which received at least one message from the leaf hub and received no messages from any other hub, identifying the single backbone port as the port to which the leaf hub is linked.

Still further in accordance with a preferred embodiment of the present invention, the method includes the step of performing, if a plurality of backbone ports is found, each of which received at least one message from the leaf hub and from no other hub, the step of scanning the plurality of hubs corresponding to the backbone ports in order to identify a hub which received at least one message from each of the other hubs from among the plurality of hubs, and identifying the backbone port corresponding to the hub as the port to which the leaf hub is linked.

Also provided, in accordance with another preferred embodiment of the present invention, is a method for detecting a layout of an at least partly switched local network including at least one switching hub connected to a first plurality of end-stations via a second plurality of ports defining a corresponding second plurality of end-station to port connections, the method including, for each switching hub, identifying the end-stations which communicate via the switching hub, and identifying the switches which are connected to the switching hub.

Further in accordance with a preferred embodiment of the present invention, the employing step includes repeating the categorizing and determining steps wherein, for each repetition, the end-stations connected to each leaf hub are treated as though they were end-stations connected to the hub to which the leaf hub is linked.

Still further in accordance with a preferred embodiment of the present invention, the at least partly switched local network includes a plurality of network portions, at least one of the plurality of network portions including a shared Ethernet local network and at least one of the plurality of network portions including a switched local network, and the method also includes the step of determining a connection structure between all of the network portions.

Also provided, in accordance with a preferred embodiment of the present invention, is apparatus for monitoring a layout of a local network, the network including a first plurality of ports associated, via end-station to port connections, with a second plurality of end-stations, the apparatus including a network layout identifier operative to generate a representation of the layout of the network, and a network layout updater operative to update the representation if only a portion of the layout of the network changes.

Further in accordance with a preferred embodiment of the present invention, the portion of the layout which changes includes at least one end-station which is moved so as to be connected to a different port.

Also provided, in accordance with another preferred embodiment of the present invention, is a method for monitoring a layout of a local network, the network including a first plurality of ports associated with one another via at least one port to port connections, and associated, via end-station to port connections, with a second plurality of end-stations, wherein at least one of the port to port connections passes through a bridging element, the method including determining and storing the layout of the network including identifying all port to port connections, and identifying all port to port connections which include bridges, the identifying step including conveying messages which do not pass through bridging elements and identifying ports which did not receive the messages.

Further in accordance with a preferred embodiment of the present invention, the bridging element includes a bridge which may include one of the following: a bridge, and a switch cloud, where a switch cloud is defined as a portion of the network with only switches.

Also provided, in accordance with another preferred embodiment of the present invention, is a method for identifying addresses of bridges included in port to port connections, each of which connect at least two ports from among a multiplicity of ports of a network, the method including providing a plurality of bridge addresses to be matched to the bridges, monitoring each of the multiplicity of ports for spanning tree messages, each of which includes bridge identification information which identifies a bridge which sent it, and for each spanning tree message, using the bridge identification information to identify the address of the bridge which sent the spanning tree message, from among the plurality of bridge addresses.

Further in accordance with a preferred embodiment of the present invention, the step of using includes, for each spanning tree message, identifying a pair of subtrees connected by a bridge, whose nodes are bridges and repeaters and whose arcs are bridge-bridge, bridge-repeater and repeater-repeater connection wires, such that the spanning tree message passes through the first subtree and does not pass through the second subtree, and identifying the root of the first subtree as the bridge which sent the spanning tree message.

Also provided, in accordance with another preferred embodiment of the present invention, is a method for storing a network layout, the method including storing network layout information in a database, and providing a database management system operative to access the network layout information.

Further in accordance with a preferred embodiment of the present invention, the database includes an object-oriented database.

Also provided, in accordance with another preferred embodiment of the present invention, is database apparatus for representing the layout of a network, the apparatus including a computerized representation of a plurality of elements included in a network, a computerized representation of data communication links between individual ones of the plurality of elements, and a computerized representation of containment relationships each indicating that a first one of the plurality of elements is included in a second one of the plurality of elements.

Further in accordance with a preferred embodiment of the present invention, the computerized representation of the plurality of elements includes a plurality of object-oriented programming objects.

Still further in accordance with a preferred embodiment of the present invention, the plurality of elements are of more than one type and the plurality of objects are of more than one class and each type of element is represented by a corresponding class of object.

Additionally in accordance with a preferred embodiment of the present invention, the plurality of elements included in the network are of a first plurality of types of which at least a portion have at least one hierarchy relationships defined therebetween and wherein the plurality of objects are of a first plurality of classes of which at least a portion have at least one inheritance relationships defined therebetween which are respectively analogous to the hierarchy relationships.

Further in accordance with a preferred embodiment of the present invention, the hierarchy relationships include at least one of the following: a hierarchy relationship between different types of ports, a hierarchy relationship between different kinds of busses, and a hierarchy relationship between different types of interfaces.

Also provided, in accordance with another preferred embodiment of the present invention, is database apparatus for representing the layout of a network, the apparatus including a computerized representation of a plurality of elements included in a network, and a plurality of element keys associated respectively with the plurality of elements, wherein each element key indicates a location of the corresponding element within the computerized representation and a location of the corresponding element within the network.

Additionally provided, in accordance with still another preferred embodiment of the present invention, is a method for generating a hierarchical display of the layout of a network including a multiplicity of elements, the method including displaying a first level representation of the network including a first plurality of icons which is equal or less in number than the multiplicity of elements, wherein at least one of the icons represents a subset of at least one element from among the multiplicity of elements, and for each of the at least one subsets, displaying a second plurality of icons representing the subset.

Further in accordance with a preferred embodiment of the present invention, the first plurality of icons includes only first-type icons and second-type icons, wherein the first-type icons represent routers and the second-type icons represent routerless network portions which do not include any routers and which are bounded by routers.

Still further in accordance with a preferred embodiment of the present invention, the second plurality of icons includes only third-type icons and fourth-type icons, wherein the third-type icons represent bridges and the fourth-type icons represent collision domains wherein each collision domain includes a bridgeless network portion which does not include any bridges and which is bounded by bridges.

Also provided, in accordance with another preferred embodiment of the present invention, is a method for generating a display of a network layout, the method including displaying a first plurality of network elements and a second plurality of connections between individual ones of the first plurality of network elements, and displaying a representation of at least one characteristics of at least one of the second plurality of connections.

Still further in accordance with a preferred embodiment of the present invention, the at least one connection includes a connection between a switching hub and at least one other network element and wherein the at least one characteristics displayed include an identification of a card slot in which the card to which the network element is connected, an identification of a port of the card to which the network element is connected and an identification of a bus to which the port is connected.

Also provided, in accordance with yet another preferred embodiment of the present invention, is a method for managing a network including a plurality of elements including at least one switching hubs, the method including generating a display of the network including generating at least one hotspots respectively representing at least one switching hubs included in the network, and, upon selection of an individual one of the hotspots, activating a switching hub manager which is operative to manage the switching hub corresponding to the individual hotspot.

Also provided, in accordance with another preferred embodiment of the present invention, is a method for displaying a network layout, the network including a plurality of elements including at least one hubs, the method including accepting a user's selection of an individual hub from among the at least one hubs, and generating a hub-centric view display of the network including only the individual hub and at least a subset of the elements connected therewith.

Further in accordance with a preferred embodiment of the present invention, at least one elements are connected to the individual hub via at least one Ethernet ports and at least one elements are connected to the individual hub via at least one switched ports and wherein the subset of elements displayed in the hub-centric view includes a user-selected one of the following: only the elements connected to the individual hub via the Ethernet ports, and only the elements connected to the individual hub via the switched ports.

Still further in accordance with a preferred embodiment of the present invention, the method also includes reading the operational status of each of the end-stations from a network management platform associated with the network, and generating a display of the layout of the network including a display of the operational status of each of the end-stations.

Further in accordance with a preferred embodiment of the present invention, the apparatus also includes a network management platform, an operational status reader operative to read the operational status of each of the end-stations from the network management platform associated with the network, and generating a display of the layout of the network including a display of the operational status of each of the end-stations.

Still further in accordance with a preferred embodiment of the present invention, the method also includes reading the operational status of at least one of the elements from a network management platform associated with the network and wherein the display of the layout of the network includes a display of the operational status of at least one of the elements.

Also provided in accordance with a preferred embodiment of the present invention, is network layout display apparatus operative to display a layout of at least a portion of a network including a plurality of elements, each pair of elements from among the plurality of elements being connected by a path including at least one of the following elements: a hub, a bridge and a router, the apparatus including a user input device operative to prompt a user to select an individual pair of elements from among the plurality of elements, and network portion display apparatus for displaying a representation of the individual pair of elements and the path connecting them.

Further in accordance with a preferred embodiment of the present invention, the pair of elements includes a pair of end-stations.

Still further in accordance with a preferred embodiment of the present invention, the user input device is operative to prompt a user to select an individual end-station and wherein the network portion display apparatus is operative to display the path connecting the individual end- station to the hub within the network which is nearest to the individual end-station.

Still further in accordance with a preferred embodiment of the present invention, the user input device is operative to accept a user's characterization of an element which is based on any of the following characterizing information items: a MAC address of the element, an IP address of the element, and a host name of the element Additionally in accordance with a preferred embodiment of the present invention, at least one of the plurality of elements includes an end-station.

Still further in accordance with a preferred embodiment of the present invention, at least one of the plurality of elements includes a router interface and also including the step of identifying router interfaces which belong to a single router.

Also provided, in accordance with another preferred embodiment of the present invention, is apparatus for determining the layout of a network including a multiplicity of network elements based on information collected from the plurality of network elements, the apparatus including a plurality of network element polling devices which operate in parallel to poll the multiplicity of network elements, thereby to collect the information therefrom, and a network layout deriving unit operative to receive the information from the plurality of network element polling devices and to derive the layout of the network therefrom.

Additionally in accordance with a preferred embodiment of the present invention, the plurality of network element polling devices operate off-line.

BRIEF DESCRIPTION OF THE DRAWINGS

The present invention will be understood and appreciated from the following detailed description, taken in conjunction with the drawings in which.

Attached herewith are the following appendices which aid in the understanding and appreciation of one preferred embodiment of the invention shown and described herein:

Appendix A is a set of computer listings which together form a preferred software implementation of a network layout detecting method constructed and operative in accordance with a preferred embodiment of the present invention; and User guide information for the network layout detecting method of Appendix A may be obtained from The User Manual of TerrainMaster Version 1.0, commercially available from Madge Networks, San Jose, Calif., USA.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
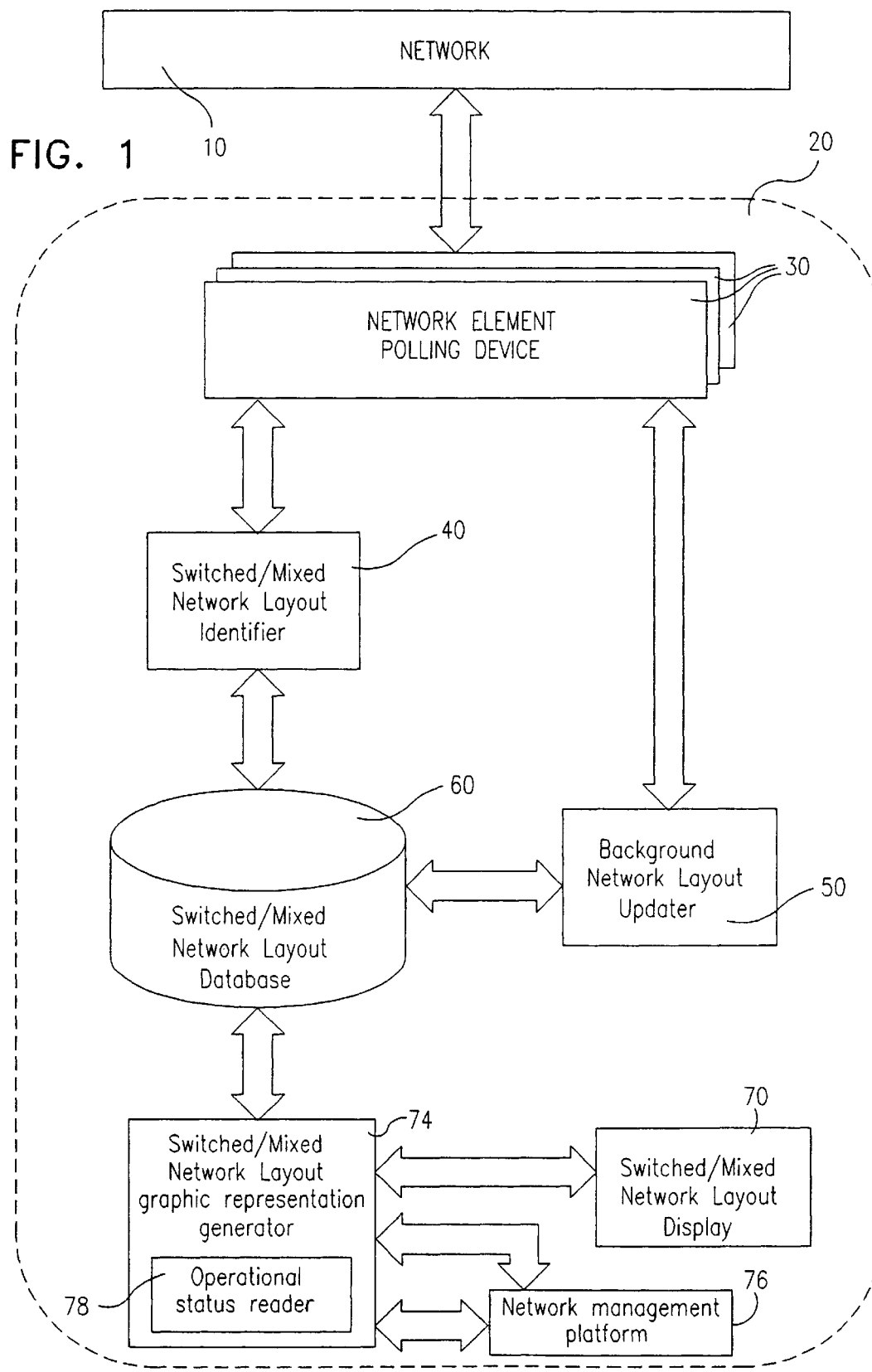
FIG. 1 is a simplified block diagram of a network and an associated system, constructed and operative in accordance with a preferred embodiment of the present invention, for determining and displaying the physical layout of the network.

Reference is now made to FIG. 1 which is a simplified block diagram of a network 10 and an associated system 20, constructed and operative in accordance with a preferred embodiment of the present invention, for determining and displaying the physical layout of the network 10. The layout determining system 20 preferably comprises at least one and preferably a plurality of network element polling devices 30 which are operative to poll each of the elements of the network 10 in order to collect information useful in deriving the layout of the network. The information may, for example, include the addresses of all interfaces of each router, the types and slot locations of all cards in each hub, the status of each port. Typically, all SNMP requests initiated by layout identifier 40 and layout updater 50 are processed by the polling devices 30.

Preferably, the elements of the network are partitioned into a plurality of subsets and each subset is polled by an individual one of a plurality of polling devices 30.

A switched/mixed network layout identifier 40 is operative to identify the layout of a network based on the information collected by the polling devices 30. The network may comprise a switched network or a mixed network which includes both shared network portions and switched network portions.

Optionally, a background network layout updater 50 is provided.

A switched/mixed network layout database 60 which stores the layout of the switched or mixed network, preferably including the addresses of the end-stations connected to each of the hubs in the network. The database 60 is preferably accessible both to the layout identifier 40 and to the layout updater 50. A graphic representation of the layout is displayed on a switched/mixed network layout display 70 such as the display of a UNIX workstation with X windows. The graphic representation of the layout is generated by a graphic representation generator 74. Preferably, the graphic representation generator 74 is operative to receive services and/or additional information from a network management platform 76. For example, the graphic representation generator 74 typically utilizes display services provided by the network management platform 76 such as the OpenView Windows APIservice provided by the HP-OpenView network management platform 76. The graphic representation generator 74 preferably includes an operational status reader 78 operative to read the operational status of each element in the network from the network management platform 76. The graphic representation of the network displayed on display unit 70 preferably includes a display of the operational status of each of said end-stations. For example, the colors red, yellow and green may be employed to indicate non-functioning, malfunctioning and properly functioning network elements respectively.

FIGS. 12 and 15–19 are examples of displays of network layouts.

Unit 40 is described in detail below with reference to FIG. 2. Unit 60 is described in detail below with reference to FIG. 7.

Optional unit 50 is preferably operative to identify end-stations which have been added to the network since the network's layout was identified or which have been moved from place to place within the network since the layout was identified.

Figure 13:
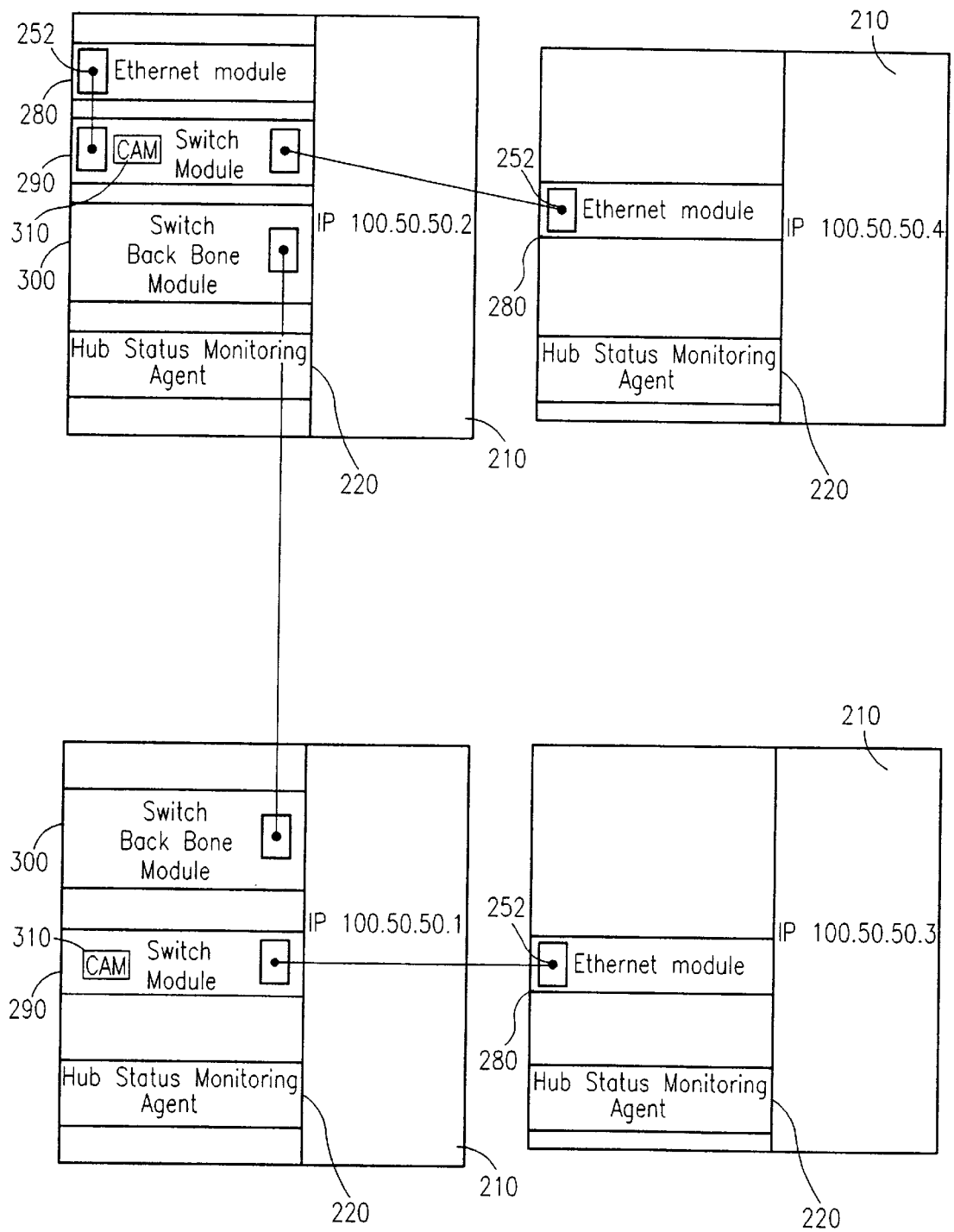
FIG. 13 is an example of a mixed network.

Typically, each switching hub in the network 10 includes a hub status monitoring agent, as shown in FIG. 13, which is capable of identifying that a change has taken place in a CAM (content addressable memory) within one of the switch modules included in that switching hub.

Figure 2:
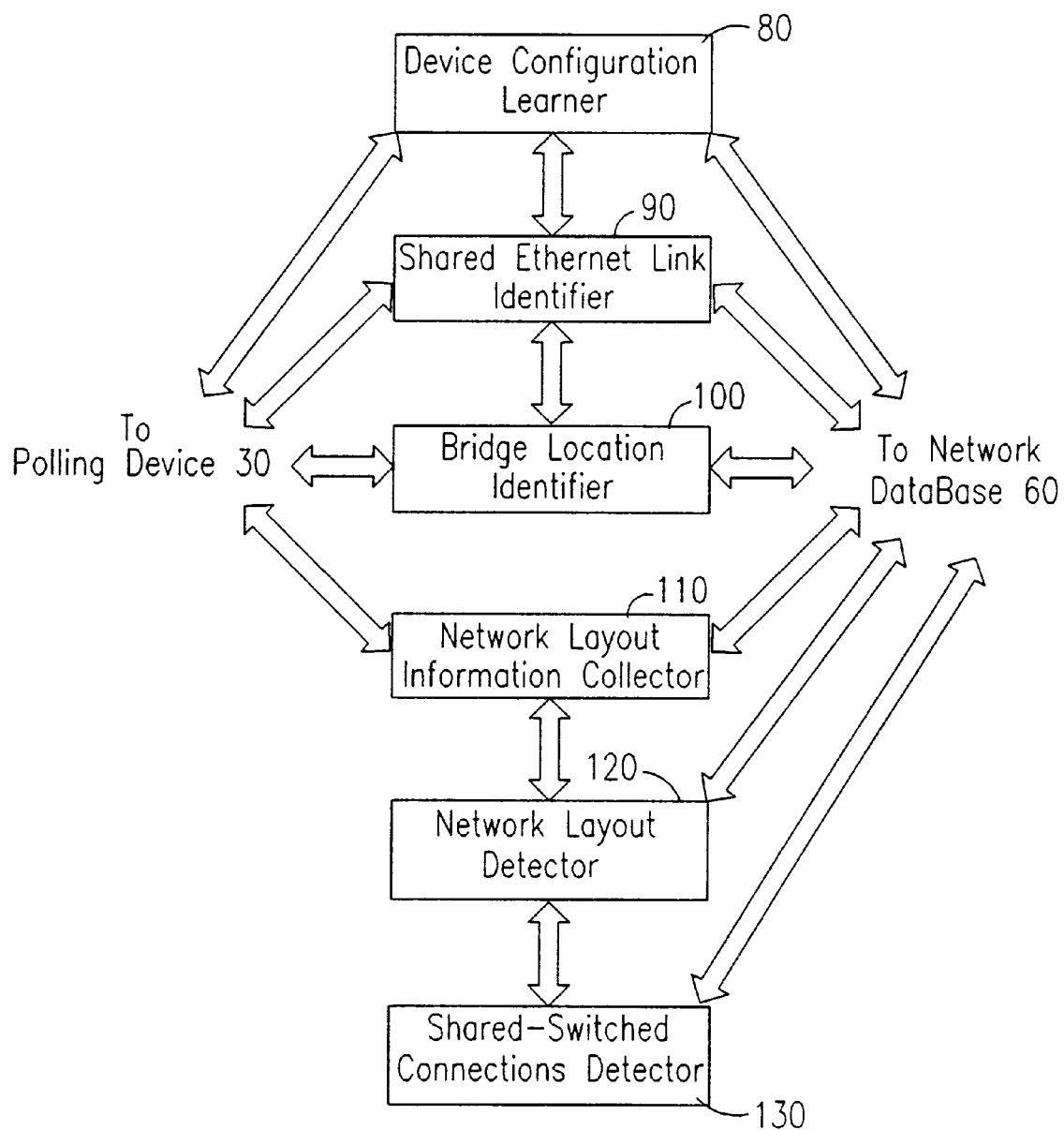
FIG. 2 is a simplified block diagram of a preferred embodiment of the network layout identifier of FIG. 1 suitable for identifying the layout of a switched or mixed network.

FIG. 2 is a simplified block diagram of a preferred embodiment of the network layout identifier 40 of FIG. 1 which is suitable for identifying the layout of a switched or mixed network such as an Ethernet switched or mixed network.

The network layout identifier 40 preferably includes a device configuration learner 80, a shared Ethernet link identifier 90, a bridge location identifier 100, a network layout information collector 110, a network layout detector 120 and a Shared-Switched Connections Detector 130.

The operation of the units of FIG. 2 is now described. The device configuration learner 80 interfaces with the device manager in order to learn the configuration of each individual hub within the network 10 and stores this information in the network layout database 60.

The Ethernet link identifier 90 is operative to identify Ethernet links within mixed networks. Mixed networks comprise a plurality of network portions, at least one of which is shared and at least one of which is switched. Unit 90 identifies the Ethernet links within each shared network portion and stores this information in the database 60.

A preferred Ethernet link identifier 90 is described in the following section:

1. General Description

1.1 Product Overview

Link identifier 90 performs an automatic process that helps the user find the physical layout of a shared network. The process is based on already known hub's configuration information stored in each agent and on a special search procedure designed to find interhub connections and bridge connections. The process is able to place bridges in the map of the layout of the shared network, and does not find the layout of the shared network over the routers.

The link identifier 90 utilizes the Object Store database, which is provided with the link identifier application.

1.2 Features

Discovery and mapping of the following items:

Station to port connections for single station Ethernet ports.

Interhub connections that answer to the following criteria:

The hubs are connected via Ethernet connections.

The connections are not via stand alone modules.

The following categories of bridges:

Madge integrated bridges (including routers that support bridging). Both the locations and the IPs of these bridges are discovered.

Any non Madge bridge that supports IP and spanning tree. Both the locations and IP addresses of these bridges are discovered.

Location of all other bridges, without their IP addresses.

1.3 Limitations

1. In order to properly operate, the network management console running the link identifier application must have write access to all hubs in the investigated shared sub-shared network.

2. Token rings and FDDI rings are not treated by the link identifier application at all.

3. There must not be more than one console activating the discovery process at a time on a single flat net (i.e., an area on the net bordered by routers). If two (or more) management stations simultaneously activate the discovery process, both link identifier applications come up with faulty results.

4. All products that are transmitting in the domain of the layout of the shared network and that have a MAC address with the Madge vendor code must have the U/L bit in their MAC address (second transmitted bit) set to '0'.

1.4 Agent Support

The link identifier 90 is supported by the following network management agents: NMA-II, NMA-RE, NMA-E, SH-EMA, NMA and for the following HUBs: LET-10, LET-18, LET-18E, LET-20, LET-36, LET-36-01, SH-EFN, SH-E8, SH-E16.

2. Detailed Functional Description

2.1 Overview

To meet the requirements of the layout of the shared network, the console integrates the hub configuration data stored in the agents and interhub connection data discovered by the discovery algorithm.

The configuration information stored in the agent does not contain information about inter hub connection.

To find the inter hub connections, the console asks each agent to transmit a special message over its backplane buses (NMA-II, NMA-RE: 4 backplane buses; NMA-E: 2 backplane buses; SH-EMA: 1 backplane bus; NMA: 1 backplane bus) and asks the other agents to listen to this message. An agent that gets this message stores in its Transmission Table the following parameters:

group, port, received on backplane bus #, sending Agent address, sending Agent backplane bus #.

During the discovery process, the console gets the following information from each Agent:

Type of each port in the hub (Madge type).

"User status" of each Ethernet port in the hub (single user/multi-user).

MAC addresses of stations connected to the port.

The agent transmission table, also termed herein "the interhub connection table", defined below.

2.2 Agent

2.2.1 Agent's Data Construction

2.2.1.1 Single/Multi-User Port

The agent identifies single or multi user port. The data is available to the manager in the ethTopLSATable which also stores the port to address correlation.

2.2.1.2 Port to Address Correlation

The port to address correlation is stored by the agents in the ethTopLSATable. Each of the items in the table stores the addresses seen at up to 56 ports. The ordering of the data in these items is: card1/Port1, card1/Port2, . . . card1/Port n, card2/Port1, . . .

The first bit (MSB) of the slot byte defines the user status: '0'-single user; '1'-multi user.

2.2.1.3 Agent Transmission Table

This table holds the information that the agent sees through its backbone interfaces. It is used for both the interhub messages and the Bridge Discovery messages. The table is an unordered continuous table . The table size is bounded so the console is required to manage the special message activity on the shared network in such a way that the data is not lost.

Table size: 132 elements for Intel 86186 agents and 528 elements for NMA-RE.

Element: group, port, received on backplane bus #, sending agent address, sending Agent backplane bus

| Data | group | port | received on backplane bus # | sending Agent address | sending Agent backplane bus |
| --- | --- | --- | --- | --- | --- |
| Field Size | 1 Byte | 1 Byte | 1 Byte | 6 Bytes | 1 Byte |

The Agent decodes the message to obtain the following parameters:

Group, Port: calculated from the transmit address.

Sending agent address: calculated from the MAC source address used in the message.

Sending Agent backplane bus: identified by the length of the packet.

Received on backplane bus: the performance chip backplane bus connection.

2.2.2 Agent's Activities

2.2.2.1 Source Address For Messages About the Shared Network Layout

For discovering interhub connections and bridge locations the agents transmit special messages about the shared network layout. These messages are identified by receiving agents as messages of the shared network layout by their MAC source address. To achieve this, all special messages transmitted by the agents have the U/L bit (the second transmitted bit of the address, i.e. add 0×02 to the left byte). In addition, agents with non-Madge MACs change their MAC addresses to a Madge address when transmitting messages of the shared network layout. The following table defines the MAC source address used by the agents for special messages (bold numbers denote changes in the MAC):

|   | Real MAC | Special Message MAC | Notes |
|---|---|---|---|
| 1 | 00:40:0D:XX:YY:Z | 02:40:0D:XX:YY:ZZ | Madge MACs. |
| 2 | 00:00:0D:C4:XX:Y | 02:40:0D:4B:XX:YY | Fibronics SH-EMA. |

When agents receive messages about the shared network layout they identify them as such by the following rules:

The U/L bit in the address is '1'.

The message has a Madge address (00:40:0D:XX:XX:XX).

Note: Since the U/L bit is used to identify the messages about the shared network layout, other Madge agents are not allowed to have this bit in the '1' state when the link identifier 90 is being activated.

2.2.2.2 Acknowledging Bridges

To verify that the agent's MACs are known to bridges on the segment, the agents transmit the bridge acknowledgment messages. The acknowledgment process includes 5 subsequent transmissions from each interface, every 0.5 seconds.

Destination address (6 bytes): Ethernet Multicast: 01:40:0D:00:00:00

Source address (6 bytes): According to the definition of the source address for messages about the shared network layout, according to the agent's real MAC.

Type (2 bytes): 0×A000

Data Length: 112 bytes.

Data Contents: Don't care.

NOTEP: the length of this message is 112 bytes so that it is not considered by receiving agents as a legitimate interhub connection message, and is not registered in the transmission table.

2.2.2.3 Transmitting Interhub Connection Discovery Messages

Trigger: (SNMP) MIB item: ethTopDiscoveryTx is set to txInterhubMsg(2) by the manager.

Output: Transmits special messages to other agents over its Ethernet backplane buses.

Activity:

The interhub connection transmission is constructed of two parts:

1. transmit 5 bridge acknowledgment messages, waiting 0.5 seconds between each transmission (a total time of ~2 seconds).
2. transmit 2 interhub messages with a minimal delay time between them.

NMA-RE agents perform these activities on all interfaces at the same time.

Intel 86186 agents perform these actions in sequence, i.e.:

transmit bridge acknowledgment messages on backplane bus #(as defined in step #1 above), transmit interhub messages on backplane bus #1 (as defined in step #2 above), repeat these actions for backplane bus #2, repeat these actions for all other backplane buses.

When the agent completes the transmission over the current backplane bus it sets the value of ethTopDiscoveryTx to idle(1).

Note: The agent does not transmit on backplane bus 4 if a switch module is present in the hub, even if the manager requests a transmission.

Message Structure:

| Destination Address | Source Address | Type | Data | CRC |
|---|---|---|---|---|

Destination address (6 bytes): Ethernet mulitcast: 1:40:0D:00:00:00.

Source address (6 bytes): The address for messages about the shared network layout according to the agent's MAC ( see above).

Type (2 bytes): 0×A000.

Data Length: the length of the data in the message is according to the backplane bus on which it is transmitted. Backplane bus 1—64 bytes; backplane bus 2—76 bytes; backplane bus 3—88 bytes; backplane bus 4—100 bytes.

Data Contents: Don't care.

2.2.2.4 Receive Interhub Messages

Trigger: A special message coming over the monitoring backplane bus. (See format in 2.2.2.3).

Output: Data in the transmission table (ethTopMessageResultTable).

Activity: Identify card port, received on backplane bus #, sending agent's MAC address (real MAC and not the one used in the message), and sending agent's backplane bus from the performance chip. This data is added to the transmission table.

Notes:

The agents analyze special messages when the item topDiscovery is set to topMessages(2).

Intel 86186 agents do not perform any backplane bus monitoring when in this state.

The topDiscovery item is controlled by a timer and is automatically returned to the idle state after the time defined by the timer (topDiscoveryTimeOut).

The agent adds entries to the table until it fills up. Old data is not overwritten with newly received messages. It is the manager's duty to clear the table when necessary.

RISC based agents receive the messages on all their backplane buses simultaneously; Intel 86186 agents receive the messages on the active backplane bus only, and it is the management console's duty to switch between monitoring backplane buses.

The message is identified as one that should be analyzed by the agent by its MAC Source Address and by its length. Messages with the following source MAC addresses are considered as messages about the shared network layout:

|   | Special Message Source MAC | Real MAC | Notes |
|---|---|---|---|
| 1 | 40:40:0D:XX:YY:ZZ | 00:40:0D:XX:YY:Z | Madge MACs. |
| 2 | 40:40:0D:4B:XX:YY | 00:00:0D:C4:XX:Y | Fibronics SH-EMA. |

2.2.2.5 Transmit Bridge Discovery

This process is used for a basic discovery of bridges. The process is constructed of transmission of two types of messages: Bridge Acknowledgment messages and Bridge Discovery messages.

Trigger: The value of ethTopDiscoveryTx is set by a manager to txBridgeMsg(3).

Result: The agent transmits the set of messages as defined below over the shared network.

Bridge Discovery Message Format:

This message is designed to be filtered by bridges that receive it after reception of a Bridge Acknowledgment message. The message is learned by other agents on the net in the same way that interhub messages are learned.

Destination address (6 bytes): the same as the source address.

Source address (6 bytes): As defined for source addresses of messages about the shared network layout, according to the agent's real MAC.

Type (2 bytes): 0×A000.

Data Length: the length of the data in the message is according to the backplane bus on which it is transmitted: backplane bus 1—64 bytes; backplane bus 2—76 bytes; backplane bus 3—88 bytes; backplane bus 4—100 bytes.

Data Contents: Don't care.

Activity:

The bridge discovery transmission is constructed of two parts:

1. transmit 5 bridge acknowledgment messages, waiting 0.5 seconds between each transmission (a total time of ~2 seconds).
2. transmit 2 bridge discovery messages with a minimal delay time between them.

NMA-R E agents perform these activities on all interfaces at the same time.

Intel 86186 agents perform these actions in sequence, i.e.:

transmit bridge acknowledgment messages on backplane bus #1 (as defined in step 1 above), transmit bridge discovery messages on backplane bus #1 (as defined in step #2 above), repeat these actions for backplane bus #2, repeat these actions for all other backplane buses.

When the agent completes the transmission over the current backplane bus it sets the value of ethTopDiscoveryTx to idle(1).

Note: The agent does not transmit on backplane bus 4 if a switch module is present in the hub, even if the manager requests a transmission.

2.2.2.6 Receive Bridge Discovery

Reception of Bridge Discovery messages is performed in the same manner as the reception of Interhub messages. These messages are interpreted in the same manner as Interhub messages and reported in the transmission table.

Trigger: A special message coming over the monitoring bus. (See format in 2.2.2.3).

Output: Data in the transmission table (ethTopMessageResultTable).

Activity: Identify group, port, received on backplane bus #, sending agent's MAC address (real MAC and not the one used in the message), and sending agent's backplane bus from the performance chip. The data is added to the transmission table.

Notes:

The agents analyze special messages when the item topDiscovery is set to topMessages(2).

Intel 86186 agents do not perform any backplane bus monitoring when in this state.

The topDiscovery item is controlled by a timer and is automatically returned to the idle state after a pre-defined period of time (topDiscoveryTimeOut).

The agent adds entries to the table until it fills up. Old data is not overwritten with newly received messages. It is the manager's duty to clear the table when necessary.

RISC based agents receive the messages on all their backplane buses simultaneously;

Intel 86186 agents receive the messages on the active backplane bus only, and it is the management console's duty to switch between monitoring buses.

The message is identified as one that should be analyzed by the agent by its MAC Source Address and by its length. Messages with the following source MAC addresses are considered as messages about the shared network layout:

| Special Message Source MAC | Real MAC | Notes |
| --- | --- | --- |
| 1  02:40:0D:XX:YY:ZZ | 00:40:0D:XX:YY:Z | Madge MACs. |
| 2  02:40:0D:4B:XX:YY | 00:00:0D:C4:XX:Y | Fibronics SH-EMA. |

2.2.2.7 Set Monitoring Bus

This activity is used by the management console for instructing Intel 86186 agents to capture messages about the shared network layout on its different backplane buses. This is required since Intel 86186 agents receive messages only on the active monitoring bus. This activity is used for the following shared network layout activities:

reception of interhub messages;

reception of bridge discovery messages;

finding bridge MAC addresses.

Trigger: (SNMP) MIB item: ethAgPerfBusSelection in ethAgTable.

Output: None.

Activity: Used for NMA-II and NMA-E only. Tells the agent to switch its performance chip to the specified backplane bus.

2.2.2.8 Clear Transmission Table

Trigger: (SNMP) MIB item: The variable ethTopClearMessageResult is changed to clear(2) by the manager.

Output: None.

Activity: Clears the Agent's transmission table. The Agent sets all the table elements to '0' and clears the contents of the transmission table. When the agent finishes clearing the table it sets the variable ethTopClearMessageResult to idle(1).

2.2.2.9 Send Agent's Transmission Table

The console can get the transmission table by reading the relevant MIB items (ethTopMessageResult.x). See MIB below.

2.2.2.10 Sending Port to Address Correlation and Port User Type

To get the port to address correlation, the manager gets all ethTopLSA items.

2.2.2.11 Finding Bridge MAC Addresses

Trigger: (SNMP) MIB item: TopDiscovery is changed to macFind(3) by the manager.

Output: Report findings in the ethTopMACFindResultTable.

Activity: Start looking for a list of up to 6 MAC SA and map them per port. For NMA-RE this activity is performed on all backplane buses. For other agents, this activity is performed only on the active monitoring bus; it is the management console's duty to switch between the agent's monitoring buses.

The duration of the activity is defined by the value of topDiscoveryTimeOut (in seconds). At the end of the time the agent stops searching and returns the value of TopDiscovery to idle(1). It is the console's duty to change the monitoring bus and restart the search for Intel 86186 agents.

Results are reported in ethTopMCFindResultTable, in the row that relates to the backplane bus on which the MAC was found, according to the following structure:

| MAC Address | Slot | Port |
|---|---|---|
| 6 bytes | 1 byte | 1 byte |

Note: When this activity is triggered (topDiscovery= macFind(2)), the agent first sets the values of the investigated backplane bus(es) to null, and only then starts writing new data.

2.2.2.12 Sending the MACFind Table

The console can get the table by reading the ethTop-MACFindResult. (See MIB below).

2.3 Console 2.3.1 Discovery of Hub Interconnections

The console manages the discovery of interhub connections by instructing agents to perform the interhub connection discovery activity, collecting the data, and analyzing it. The operations performed by the console are:

1. Reads the monitoring buses of the Intel 86186 agents and stores this data.
2. Sets the topDiscovery of all agents on the shared network to idle.
3. Starts the hub loop:
    3.1. Chooses any 16 hubs on the shared network.
    3.2. Sets the value of topDiscoveryTimeOut for all agents to a predetermined number of seconds. The time is set once for every hub loop, i.e. it is the time needed for reception of the messages on all backplane buses of the agent (for NMA-E the time is 4 times longer than that for NMA-RE).
    3.3. Sets all agents to the interhub message search mode (topDiscovery=topoMessage(2)), and marks all agents as 'listening'.
    3.4. Clears the transmission table on all agents (ethTopClearMessageResult=clear(2)).
    3.5. Starts the backplane bus loop:
        3.5.1. Changes the monitoring buses of the Intel 86186 agents to i ($1 \leq i \geq$ number of backplane buses).
        3.5.2. Instructs the agents selected in section 3.1 to transmit the special message (ethTopDiscoveryTx= txInterhubMsg).
        3.5.3. Waits until all agents have stopped transmitting.
        3.5.4. Gets the discovery table from all 'listening' agents.
        3.5.5. Stops the discovery of those agents that have already listened on all their backplane buses (e.g., for RISC agents this is done after one backplane bus loop), by setting topDiscovery=idle(1); deletes these agents from the list of 'listening' agents.
        3.5.6. Performs sections 3.5.1.–3.5.5. with the next backplane bus in the hubs.
    3.6. performs sections 3.1.–3.5. with a new group of 16 hubs.
4. Restores the monitoring buses of the Intel 86186 agents to their status prior to the beginning of the discovery process.
5. Checks for duplicate information in the tables received from the agents (each agent transmits twice on each of its backplane buses) and deletes such redundancies if they exist.
6. Integrates the information received from the agents to find the shared network's interhub connections.

2.3.2 Station Discovery

Station discovery is based on the last source addresses discovered by the agent, which are stored in the ethTopLSATable. Stations are discovered by the agents by last source address learning. RISC agents study stations connected to all the backplane buses in their hub, while Intel 86186 agents study only stations connected to its monitoring bus. Discovery of stations on backplane buses other than the monitoring backplane bus on Intel 86186 agents is performed by the link identifier 90 in two occasions:

At the end of the shared network layoutdiscovery process, for all Intel 86186 agents discovered by the link identifier 90.

Upon a user initiated request.

To initiate a study session for Intel 86186 agents the console performs the following:

Sets the value of busSLMTime for all the hub's backplane buses to 20 seconds.

Sets the value of busSLMStatus for all the hub's backplane buses to self learning(2). 2.3.2.1 Single/Multi Station Ports Only stations connected to single user port are presented by the link identifier application. Multiple user ports are treated as follows:

If the port is identified as an interhub connection, the last source data is ignored.

If the port is identified as a hub to bridge connection, the last source data is ignored.

If the port is neither of the above, it is identified by the link identifier application as a multi station port.

2.3.2 Bridge Discovery

Bridge discovery algorithms are performed after the interhub connections have been discovered.

For the discovery of non Madge bridges two methods are used:

activating the Bridge-Discover messages (see 2.2.2.5)

instructing the agents to find bridge MAC addresses.

2.3.3.1 Finding Bridges With the Bridge Discovery Messages

This is the first bridge discovery algorithm used by console. Its goals are to find the physical position of all bridges in the shared shared network. The operations performed by the console are:

1. Reads the monitoring buses of all Intel 86186 agents and stores this data.
2. Sets the topDiscovery of all agents on the shared shared network to idle.
3. Starts the hub loop:
    3.1. Chooses any 16 hubs on the shared shared network.
    3.2. Sets the value of topDiscoveryTimeOut for all agents to a predetermined value. The time is set once for every hub loop, i.e. it is the time needed for reception of the messages on all backplane buses of the agent (for NMA-E the time is 4 times longer than that for NMA-RE).
    3.3. Sets all agents to the interhub message search mode (topDiscovery=topoMessage(2)), and marks all agents as 'listening'.
    3.4. Clears the transmission table on all agents (ethTopClearMessageResult=clear(2)).
    3.5. Starts the backplane bus loop:
        3.5.1. Changes the monitoring buses of the Intel 86186 agents to i ($1 \leq 1 \geq$ number of backplane buses).
        3.5.2. Instructs the agents selected in section 3.1 to transmit the special message (ethTopDiscoveryTx= txBridgeMsg(3)).

3.5.3. Waits until all agents have stopped transmitting.

3.5.4. Gets the discovery table from all 'listening' agents.

3.5.5. Stops the discovery of those agents that have already listened on all their backplane buses (e.g., for RISC agents this is done after one backplane bus loop), by setting topDiscovery=idle(1); deletes these agents from the list of 'listening' agents.

3.5.6. Performs sections 3.5.1.–3.5.5. with the next backplane bus in the hubs.

3.6. Performs sections 3.1.–3.5. with a new group of 16 hubs.

4. Restores the monitoring buses of all Intel 86186 agents to their status prior to the beginning of the discovery process.

5. Checks for duplicate information in the tables received from the agents (each agent transmits twice on each of its backplane buses) and deletes such redundancies if they exist.

6. Integrates the information received from the agents to find the shared shared network's interhub connections.

2.3.3.2 Finding Bridges by MAC Search

To find bridges that support both IP and spanning tree, the console performs the following process:

Inquires the umbrella for IP hosts that have more than one interface.

Gets the monitoring buses of the Intel 86186 agents present in the shared shared network and stores it for later use.

Sets the value of topDiscoveryTime Out to 3 seconds (regardless of the agent type).

For each of these hosts, does the following:

1. Sends its MAC addresses to all agents in the shared shared network (ethTopMACFindList).

2. Sets the monitoring buses of all Intel 86186 agents on the shared network to 1.

3. Sets topDiscovery=macFind(3) of all agents on the shared network.

4. Waits 3 seconds.

5. Cancels the setting topDiscovery=idle(3) of all agents on the shared network.

6. Gets the values of ethTopMACFindResult from all agents.

7. For Intel 86186 agents, performs steps 1.6 with all other backplane buses as the monitoring bus.

Sets the monitoring buses of Intel 86186 agents back to their initial values.

Integrates the data received from the agents to position the bridges in the shared network.

2.4 MIB

```
lntTopology     OBJECT IDENTIFIER ::= { Madge 23 } -- Shared Network
Layout group
    -- MADGE Shared Network Layout group
    topDiscovery OBJECT-TYPE
        SYNTAX INTEGER  {
                idle(1),
                topoMessages(2),
                macFind(3)           }
        ACCESS read-write
        STATUS mandatory
        DESCRIPTION
        "The value of this item defines the activity status of the
        agent's discovery algorithm. When its value is set to
        topoMessages(2), the agent searches for the messages about
        the shared network layout (interhub and bridge messages).
        When the value is macFind(3), the agent searches for the
        MAC addresses defined in the item ethTopMACFindList.
        The results of the search are then reported in
        ethTopMACResultTable.
        The value of this item cannot be changed from
        topoDiscovery(2) to macFind(3) or vice versa without being
        first changed to idle(1).
        This item is timed by TopDiscoveryTimeOut."
        DEFVAL { 1 }
        ::= {lntTopology 1 }
    topDiscoveryTimeOut OBJECT-TYPE
        SYNTAX INTEGER
        ACCESS read-write
        STATUS mandatory
        DESCRIPTION
        "The value of this item defines the maximal time (in seconds) that
        an agent can remain in the non-idle topology discovery mode. When
        the agent is set to the shared network layout mode
        (TopDiscovery=topoDiscovery(2) or macFind(3)) the counter is
        started. If the manager doesn't return the agent back to normal
        operation mode within the timeOut, the agent automatically returns
        to normal operation (TopDiscovery=idle(1)) and stop searching for
        the special messages.
        The value of this item can be changed only when
        TopDiscovery=idle(1)."
        DEFVAL { 3 }
        ::= {lntTopology 2 }
    ethTop OBJECT IDENTIFIER
        ::= { lntTopology 3 }
    ethTopDiscoveryTx OBJECT-TYPE
        SYNTAX INTEGER {
                idle(1),
```

```
            txInterhubMsg(2),
            txBridgeMsg(3)        }
        ACCESS read-write
        STATUS mandatory
        DESCRIPTION
        "This item is a switch that activates the inter-agent messages
        about the shared network layout.
        txInterhubMsg(2) - the agent transmits interhub discovery
        messages.
        txBridgeMsg(3) - the agent transmits bridge discovery
        messages."
        DEFVAL { 1 }
        ::= {ethTop 1 }
ethTopClearMessageResult OBJECT-TYPE
        SYNTAX INTEGER    {
                idle(1),
                clear(2)              }
            ACCESS read-write
            STATUS mandatory
            DESCRIPTION
        "When this item is set to clear(2), the agent sets the values
        of all ethTopMessageResult items to '0'. When finished the
        'clear' process the Agent sets the variable to idle(1)."
        DEFVAL { 1 }
            ::= { ethTop 2 }
ethTopNumOfMessageResults OBJECT-TYPE
        SYNTAX INTEGER
            ACCESS read-write
            STATUS mandatory
            DESCRIPTION
        "This item contains the number of messages currently
        stored in the ethTopMessageResultTable."
        ::= { ethTop 3 }
ethTopMessageResultTable OBJECT-TYPE
        SYNTAX SEQUENCE OF ethTopMessageResultEntry
        ACCESS not-accessible
        STATUS mandatory
        DESCRIPTION
        "A table that contains the results of the messages about the
        shared network layout received by the agent."
        ::= { ethTop 4 }
ethTopMessageResultEntry OBJECT-TYPE
        SYNTAX EthTopMessageResultEntry
        ACCESS not-accessible
        STATUS mandatory
        DESCRIPTION
        "An entry in the table, containing part of the received data."
        INDEX { ethTopMessageResultId }
        ::= { ethTopMessageResultTable 1 }
EthTopMessageResultEntry ::=
        SEQUENCE            {
            ethTopMessageResultId
            INTEGER,
            ethTopMessageResult
            OCTET STRING
            }
ethTopMessageResultId OBJECT-TYPE
        SYNTAX INTEGER
            ACCESS read-only
            STATUS mandatory
            DESCRIPTION
        "The table's index. Can assume the values 1,2,3; for NMA-
        RE 1 . . . 12."
            ::= { ethTopMessageResultEntry 1 }
ethTopMessageResult OBJECT-TYPE
        SYNTAX OCTET STRING (SIZE (0 . . . 440))
            ACCESS read-only
            STATUS mandatory
            DESCRIPTION
        "A row in the table of results of the messages about the
        shared network layout. Each row contains up to 44
        elements."
        ::= { ethTopMessageResultEntry 2 }
ethTopMACFindList OBJECT-TYPE
            SYNTAX OCTET STRING ( SIZE (0 . . . 36))
            ACCESS read-write
            STATUS mandatory
            DESCRIPTION
            "Up to 6 MAC addresses to be searched for by the Agent."
            ::= { ethTop 5}
```

```
ethTopMACFindResultTable OBJECT-TYPE
    SYNTAX SEQUENCE OF ethTopMACFindResultEntry
    ACCESS not-accessible
    STATUS mandatory
    DESCRIPTION
    "A table that contains 4 rows with the results of the
    MACFind process. Each row contains the results for one of
    the hub's backplane buses."
    ::= { ethTop 6 }
ethTopMACFindResultEntry OBJECT-TYPE
    SYNTAX EthTopMACFindResultEntry
    ACCESS not-accessible
    STATUS mandatory
    DESCRIPTION
    "An entry in the table."
    INDEX { ethTopMACFindBus }
    ::= { ethTopMACFindResultTable 1 }
EthTopMACFindResultEntry ::=
    SEQUENCE        {
        ethTopMACFindBus
        INTEGER,
        ethTopMACFindResult
        OCTET STRING
        }
ethTopMACFindBus OBJECT-TYPE
    SYNTAX INTEGER
    ACCESS read-only
    STATUS mandatory
    DESCRIPTION
    "The backplane bus for which the results are reported."
    ::= {ethTopMACFindResultEntry 1 }
ethTopMACFindResult OBJECT-TYPE
        SYNTAX OCTET STRING ( SIZE (0 . . . 48))
        ACCESS read-only
        STATUS mandatory
        DESCRIPTION
    "The results of the search for the requested MAC addresses
    for the relevant backplane bus. The format is: MAC (6 bytes),
    slot (1 byte), port (1 byte).
    If the Agent doesn't find a MAC's correlation, the slot and
    port will be '0'."
    ::= { ethTopMACFindResultEntry 2}
ethTopLSATable OBJECT-TYPE
    SYNTAX SEQUENCE OF ethTopLSAEntry
    ACCESS not-accessible
    STATUS mandatory
    DESCRIPTION
    "A table that contains 8 rows with the last source addresses
    found on the hub's ports.
    Each row in the table reports the last source addresses for
    specific slots in the hub:
    #1: modules 1,2,17,18;    #5: modules 9,10,24,25;
    #2: modules 3,4,19,20;    #6: modules 11,12,26,27;
    #3: modules 5,6,20,21;    #7: modules 13,14,28,29;
    #4: modules 7,8,22,23;    #8: modules 15,16,30,31;
    The data in the items appears by the slot order defined
    above. All 8 items exist even if some of them are empty."
    ::= { ethTop 7 }
ethTopLSAEntry OBJECT-TYPE
    SYNTAX EthTopLSAEntry
    ACCESS not-accessible
    STATUS mandatory
    DESCRIPTION
    "An entry in the table, containing one LSA item."
    INDEX { ethTopLSAId }
    ::= { ethTopLSATable 1 }
EthTopLSAEntry ::=
    SEQUENCE        {
        ethTopLSAId
        INTEGER,
        ethTopLSA
        OCTET STRING
        }
ethTopLSAId OBJECT-TYPE
    SYNTAX INTEGER
    ACCESS read-only
    STATUS mandatory
    DESCRIPTION
    "The table's index. Assumes values 1,2,3, . . ., 8."
    ::= {ethTopLSAEntry 1 }
```

```
ethTopLSA OBJECT-TYPE
    SYNTAX OCTET STRING (SIZE (384))
    ACCESS read-only
    STATUS mandatory
    DESCRIPTION
    "This item contains the last source addresses for modules in
    related slots. For each port the data is: slot (one byte), port
    (one byte), address (6 bytes). For none of the existing ports is
    the LSA 0.
    The first bit (MSB) of the slot byte defines the user status:
    '0' - single user; '1' - multi user."
    ::= {ethTopLSAEntry 2 }
```

The term "single user/multi-user" and the like and "performance bus" and the like are explained in the User Guide of the MultiMan system, commercially available from Madge Networks Ltd.

The bridge location identifier 100 of FIG. 2 is operative to identify the locations of all bridges within the network. A preferred method for identifying all port to port connections which include bridges includes the following two steps:

a. Conveying messages which do not pass through bridges and identifying ports which did not receive these messages. Messages which have a source address which is identical to their destination address do not pass through bridges because bridges block a message received on interface A if the message's destination element is connected directly or indirectly to interface A, i.e. if a message from that destination element was previously received on interface A.

For example, a network may include hubs A and B separated by a bridge. When a message is transmitted by the agent of hub A to itself, i.e. when the message's source address and destination address are identical, the bridge will drop the message as explained above. Therefore, the message will not be monitored by the agent of hub B. However, if hubs A and B are not separated by a bridge, and the agent of hub A transmits a message to itself, that message will be monitored by the agent of hub B. Therefore, transmitting messages whose source and destination addresses are the same allows hub-to-hub connections which include bridges to be differentiated from hub-to-hub connections which do not include bridges.

b. Monitoring at each port for spanning tree messages, each of which identifies the bridge which sent it, and using the bridge identification information within the spanning tree messages to augment the information collected in step (a). Step (a) indicates that a bridge exists and step (b) identifies that bridge. A preferred method of performing step (b) is as follows:

1. An interface X on the hub B side of a bridge between hubs A and B, transmits a spanning tree message whose source address is X;
 2. The spanning tree message is monitored by the agent of hub B but not by the agent of hub A.
 3. The spanning tree message is monitored by the agents in network portion B which is the portion of the network connected to hub B. However, the spanning tree message is not monitored by the agent in network portion A which is the portion of the network connected to hub A.

Figure 8:
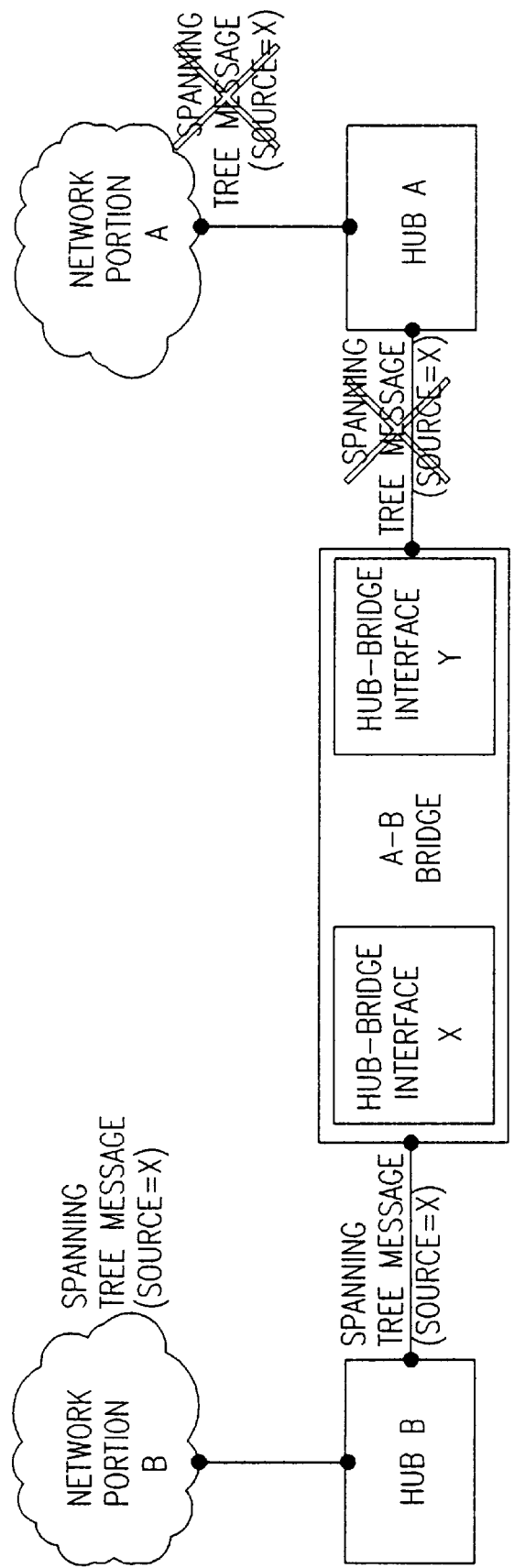
FIG. 8 is a pictorial illustration of a preferred method for identifying a bridge which is known to exist.

Steps 1–3 are illustrated in pictorial form in FIG. 8.

Figure 9:
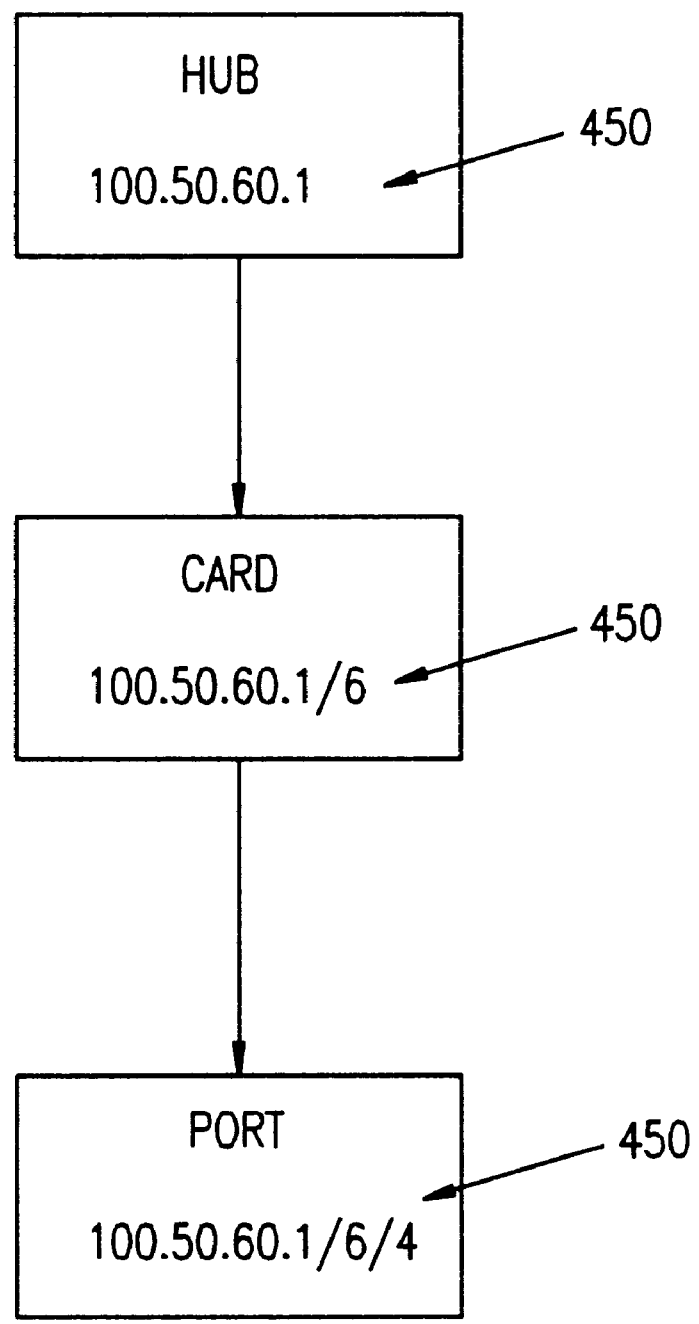
FIG. 9 is a block diagram illustration of a very simple network.

FIG. 9 is an illustration of a very simple network including 3 network elements, each having an element key 450. The element key of the first network element, which is a hub, comprises the hub agent's IP address, 100.50.60.1. The element key 100.50.60.1/6 of the second network element, which is a card inserted in the hub, comprises the hub agent's IP address, concatenated with the number of the hub slot, 6, into which the card is inserted. The element key 100.50.60.1/6/4 of the third network element, which is a port of the card, comprises the above information concatenated with the number of the port, 4.

Each Ethernet network is a tree, whose nodes are bridges and repeaters and whose arcs are bridge-bridge, bridge-repeater and repeater-repeater connection wires. Therefore, it is possible to identify, for each spanning tree message, a pair of subtrees, connected by a bridge, such that the spanning tree message passes through the first subtree and does not pass through the second subtree. The root of the first subtree is the bridge which sent the spanning tree message.

A preferred implementation of network layout information collector 110 is now described.

1. Applicability

The implementation described herein may be supported by the following Madge Network Management Agents (version 7.1): NMA-II, NMA-RE, NMA-RS, SH-EMA. These Agents may be inserted in the LET-10, LET-20, LET-36, LET-36/01, SHE-16, and SHE-24 hubs(all commercially available from Madge).

1.1. Overview 1.1.1 Ethernet Switch Layout Discovery 1.1.1.1 The Following Assumptions are the Basis for Switch Layout Discovery:

The backbone between LANSwitch hubs is either a special switch backbone module (such as LHB, LSF100 etc.) or a switch module with at least 2 internal switch ports (such as Ise208, Ise808, Ise404, Ise404s) and those ports have been defined as backbone ports on the module.

When the switch backbone does not include a CAM or a forwarding table, (LHB, Ise208, Ise404, Ise808), there must be an NMA-RS in the HUB with two or more such backbones.

The Agent does not have to be connected to the LANSwitch.

1.1.1.2 Switch Modules:

The following is the list of LANSwitch modules to be supported:

| Name | | Notes |
| --- | --- | --- |
| lse108 | lse108(87) | repeater |
| lse-208 | lse208(88) | repeater |
| lse-404 | lse404(128) | |
| lse404sfl | lse404s(145) | 1. Segmented. 2. sh-esw: sh-40sf(168) |
| lse-404srj | lse404srj(147) | Segmented. |
| lse-404sfb | lse404s-fb(146) | Segmented. |
| lse-808 | lse808(77) | sh-esw: sh-80rj(169) |
| lse-PM | lse-pm(170) | |
| lfe-100 | lfe100(153) | 100 MB Ethernet |
| lfe-1008 | lfe1008(161) | 100 MB Ethernet repeater |

1.1.1.3 Switch Backbone:

The following is a list of LANSwitch special backbone modules to be supported:

| Name | genGroupType | Notes |
|---|---|---|
| lsf-100 | lsf100(152), lsf100n(171) | Supports MIB-II, Bridge MIB and smartLSFTable (in lannet MIB - table of other lsf's in the same FDDI ring) |
| lhb | lhb(96) | |

2. MIB Support
2.1. LANNET MIB
2.1.1. Additional MIB Items

```
ethTopHSBMonitor OBJECT-TYPE
    SYNTAX INTEGER   {
        idle(1),
        startMonitor(2),
        notSupported(255)
        }
    ACCESS read-write
    STATUS mandatory
    DESCRIPTION
    "This item asks for monitoring the LANSwitch backplane bus by the NMA-RS.
    startMonitor(2) value, is used to start monitor the LANSwitch backplane bus
    collect the lsHostTimePortCorrTable."
    DEFVAL { idle }
    ::= {ethTop 9}
-- Additional Table in the lsMonitor branch
lsHostTimePortCorrTable OBJECT-TYPE
    SYNTAX SEQUENCE OF LsHostTimePortCorrEntry
    ACCESS not-accessible
    STATUS mandatory
    DESCRIPTION
    "An addition to the RMON MIBus hostTimeTable. This table contains
    a list of MAC addresses that were monitored on the high-speed backplane bus
    and the switch ports to which they are connected.
    The index of this table is the same as for the standard RMON
    hostTimeTable. Indexes are hostTimeCreationOrder and hostTimeIndex.
    The MAC address is stored in hostTimeAddress.
    The port to which the MAC address is connected is
hostTimePortConnection."
    ::= { lsMonitor 10 }
lsHostTimePortCorrEntry OBJECT-TYPE
    SYNTAX LsHostTimePortCorrEntry
    ACCESS not-accessible
    STATUS mandatory
    DESCRIPTION
    "An entry in the MAC to port correlation table."
    INDEX { hostTimeIndex, hostTimeCreationOrder }
    ::= { lsHostTimePortCorrTable 1 }
LsHostTimePortCorrEntry ::= SEQUENCE {
        hostTimeAddress         OCTET STRING,
        hostTimeCreationOrder   INTEGER (1 . . . 65535),
        hostTimeIndex           INTEGER (1 . . . 65535),
        hostTimePortConnection  INTEGER
}
hostTimeAddress OBJECT-TYPE
        SYNTAX OCTET STRING
        ACCESS read-only
        STATUS mandatory
        DESCRIPTION
        "The physical address of this host."
        ::= { lsHostTimePortCorrEntry 1 }
hostTimeCreationOrder OBJECT-TYPE
        SYNTAX INTEGER (1 . . . 65535)
        ACCESS read-only
        STATUS mandatory
        DESCRIPTION
        "An index that uniquely identifies an entry in
        the hostTime table among those entries associated
        with the same hostControlEntry. This index shall
        be between 1 and N, where N is the value of
        the associated hostControlTableSize. The ordering
        of the indexes is based on the order of each entry's
```

-continued

```
        insertion into the table, in which entries added
        earlier have a lower index value than entries added
        later. Thus the management station has the ability to
        learn of new entries added to this table without
        downloading the entire table.
        It is important to note that the index for a
        particular entry may change as an (earlier) entry
        is deleted from the table. Because this order may
        change, management stations should make use of the
        hostControlLastDeleteTime variable in the
        hostControlEntry associated with the relevant
        portion of the hostTimeTable. By observing
        this variable, the management station may detect
        the circumstances where a download of the table
        may have missed entries, and where a previous
        association between a value of hostTimeCreationOrder
        and a hostTimeEntry may no longer hold."
        ::= { lsHostTimePortCorrEntry 2 }
-- When the Agent creates the control word for this purpose, the value of
-- hostTimeIndex is constant '999'.
hostTimeIndex OBJECT-TYPE
        SYNTAX INTEGER (1 . . .65535)
        ACCESS read-only
        STATUS mandatory
        DESCRIPTION
        "The set of collected host statistics of which
        this entry is a part. The set of hosts
        identified by a particular value of this
        index is associated with the hostControlEntry
        as identified by the same value of hostControlIndex."
        ::= { lsHostTimePortCorrEntry 3 }
hostTimePortConnection OBJECT-TYPE
        SYNTAX INTEGER
        ACCESS read-only
        STATUS mandatory
        DESCRIPTION
        "The switch port to which this hostTimeAddress is connected.
        The coding of the port number varies for different hubs and
        backplanes.
        For the LANSwitch HSB the value of this item is:
        The value of this item is: 32*(S-1)+P, where S is
        the slot number in the hub and P the LANswitch
        port within the slot (1 . . . 32).
        For hosts whose port connection is not identified by the agent, the
        value of this item will be 65,535 "
        ::= { lsHostTimePortCorrEntry 4 }
```

2.2. MIB Summary

| MIB item | Note |
| --- | --- |
| topDiscovery | Moves the Agent to network layout monitoring. |
| ethTopDiscoveryTx | Used to perform transmission of special msg. |
| lseIntPortRoutingMode | The switch port routing mode. |
| ethTopHSBMonitor | Ask the NMA-RS to start monitoring the HSB and fill the MAC to Port correlation table. |
| lsHostTimePortCorrTable | This table is available only when the ethTopHSBMonitor = startMonitoring(2). |
| lseIntPortGlobal | on when the port is in Global mode. |
| genIntPortBusConnNumber | The virtual net number. |
| chLsCAMPortList | The validation status of the CAM for switch ports. |
| chLsPortList | Indicates if there are in the hub switch ports. |
| lseIntPortCAM | The CAM related to switch port. |
| lseIntPortMACAddList | The CAM related for segmented switch port. |
| lseGroupBackbone12 | Used to find backbone port in switch modules. |
| lseGroupBackbone34 | " |
| smartLSFTable | Table with MAC addresses of LSF's (and their status) in the same FDDI ring. |

-continued

| MIB item | Values |
| --- | --- |
| topDiscovery | idle(1), topoMessages(2), macFind(3), |
| ethTopDiscoveryTx | idle(1), txInterhubMsg(2), txBridgeMsg(3), txAckMsg(4) |
| lseIntPortRoutingMode | generic(1), net(2), dst-port(3), allPackets(4), notSupported(255) |
| ethTopHSBMonitor | idle(1), startMonitor(2), notSupported(255) |
| lsHostTimePortCorrTable | Table containing the correlation between MAC address to port. |
| lseIntPortGlobal | on(1), off(2), notSupported(255) |
| genIntPortBusConnNumber | 0–255 |
| chLsCAMPortList | OCTET String (size 32) |
| chLsPortList | OCTET String (size 32) |
| lseIntPortCAM | OCTET String |
| lseIntPortMACAddList | OCTET String (read-only) |
| lseGroupBackbone12 | on(1), off(2), notSupported(255) |
| lseGroupBackbone34 | on(1), off(2), notSupported(255) |
| smartLSFTable | Table containing two needed items: smartLSFMACAddr, smartLSFEntryStatus |

3. Agent

The following Agents: NMA-II, SH-EMA, NMA-RE, and NMA-RS, all commercially available from Madge Networks Ltd., support the implementation described herein. None of the software of these agents needs to be modified other than the NMA-RS.

The NMA-RS is asked to monitor the switch when there is at least one switch backbone in the hub that does not provide the table of MAC addresses (or any other host list information) while the backbone ports are in backbone mode.

3.1. Monitoring the Switch and Preparing the IsHostToPort-TimeTable

Event: MIB item ethTopHSBMonitor is set to startMonitor(2) by the Console.

Output: IsHostTimePortCorrTable.

Activity:

The only Agent to perform this activity is NMA-RS. When the Console sets the ethTopSBMonitor item to startMonitor(2), the Agent checks the running applications of SMON. The NMA-RS closes running applications if they are from Host, Matrix or Port Ext. Then, it creates a new Host control entry without any filters. The control entry includes an owner string with the "TerrainMaster" application as the owner, the HostControlIndex is '999'. Then the Agent starts calculating the IsHostTimePortCorrTable.

| The table | |
| --- | --- |
| hostTimeAddress | OCTET STRING -- The MAC address. |
| hostTimeCreationOrder | INTEGER (1 . . . 65535) -- A "running" real index in the table |
| hostTimeIndex | INTEGER (1 . . . 65535) -- A constant value index '999' |
| hostTimePortConnection | INTEGER -- The transmit address = 32*(Slot–1)+Port |

The IsHostTimePortCorrTable is available only while running the current activity (when the ethTopHSBMonitor is in startMonitor(2)).

The NMA-RS continues with the activity and blocks attempts by the Console to "kill" the "TerrainMaster" control entry, until the ethTopHSBMonitor is set to idle(1) or it reaches the timeout defined in topDiscoveryTimeOut.

Note: (for the NMA-RS general applications).

This table runs when the NMA-RS is running any of Host Stats, not only when TerrainMaster is using it.

3.2. End of Monitoring the Switch

Event: MIB item ethTopHSBMonitor is set to idle(1) by the Console, or time-out of topDiscoveryTimeOut.

Output: none.

Activity:

If there was time-out of topDiscoveryTimeOut, then the Agent sets the ethTopHSBMonitor to idle(1) and stop the monitoring activity.

Note: The IsHostTimePortCorrTable is not available in this state.

4. Console

Preferably, the layout determining the system of FIG. 1 resides on a network management console.

4.1. Overview

The Console runs Switch Network Layout tasks immediately after it runs Ethernet Network Layout tasks.

The main goal is to show the user its Ethernet physical network layout, whether it is shared Ethernet or Switch Ethernet.

The user can get the following:

1. Which end station/s connected to which Ethernet port or Ethernet segment.
2. Which end station/s connected to which Ethernet Switch port or Ethernet Switch segment.
3. Connections between hubs (which backplane bus, through which module and port)—for shared Ethernet.
4. Switch Backbone connection between hubs.

5. Bridge connections. (Integrated bridges, External managed bridges (SNMP and Spanning tree), all others are signed as unknown bridges).
6. Routers connections. (Routers connected as "single" user. If Router support bridge, then see 5.)
7. Maps are in cuts of Router Domain and Collision Domain.
8. LAN path: Always shows the physical path between two stations. (It also shows paths that go through the router, when the physical path between two points goes through the routers. The network layout does not look for a path through the router in case of ports in different virtual LANs).

4.2. Console Tasks

The Console performs some tasks to investigate the Ethernet Switch Network layout.

The first task is to find which Ethernet segment is connected to which Switch port.

The second task is to find the Switch Backbone connections between Switch hubs.

The third task is to find the stations connected to the Switch port.

4.2.1. Ethernet Segment Connection to Switch Port 4.2.1.1. Overview

In this task, the console asks all Ethernet Agents to perform the regular Ethernet network layout discovery, but does not collect the network layout result tables. After all Agents sent the Ethernet discovery messages over their Ethernet backplane buses, the Console gets from all Agents the IseIntPortMACAddTable and look for Agents MAC addresses in each IseIntPortMACAddTable to find which Ethernet segment is connected to which Switch port.

4.2.1.2. Console Procedure Steps

1. For all Ethernet Agents, set the MIB item ethTopDiscoveryTx to txInterhubMsg(2) value.

2 Get from all Agents with Switch modules in their hub the chLsCAMPortList MIB item. (Only for NMA-RE, NMA-II, and NMA-RS, including TokenRing Agents. This MB item tells the console if there is any switch module in the hub and if there are valid MAC addresses listed in the switch ports.).

3. For all Agents with significant chLsCAMPortList (see the MIB item description), the console gets the IseIntPortMACAddList (in IseIntPortMACAddTable) and look for t the Agents' MAC addresses in the MAC address list. The Output of this step is a list of Agents with switch ports connected to Ethernet segment.

| Ethernet Segment | Connected to switch port |
| --- | --- |
| Agent identifier (can be the Network layout MAC address of the Agent on the specific backplane bus) | List of all switch ports (Hub ID, card, port) that Ethernet Agent is booked in their CAM tables. |

Note: This task does not need any change in the Agent code.

4.2.2. Switch Backbone Connections Between Switch Hubs
Some definitions:

"Switch Agents" list:: A list of Agents with switch modules in their hub.

"none-CAM" supported backbone: a switch backbone from the list: LHB, Ise208, Ise404, Ise808.

4.2.2.1. Overview

In this task, the Console builds the "Switch Agents" list. All the activities from now on are with Agents from this list.

Figure 3A:
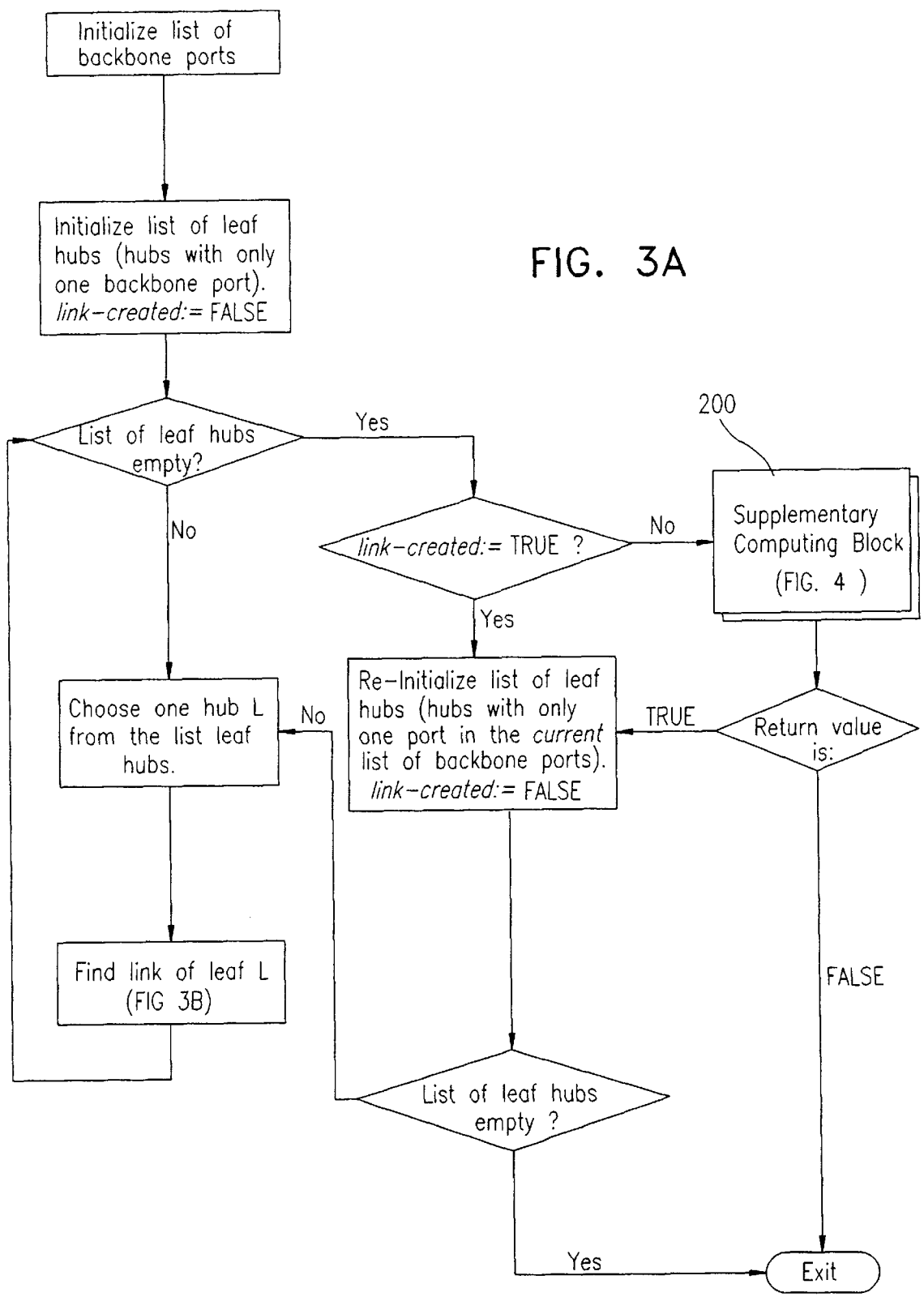
FIGS. 3A and 3B, taken together, form a simplified flowchart illustration of the initial network layout computing block of FIG. 2.
Figure 3B:
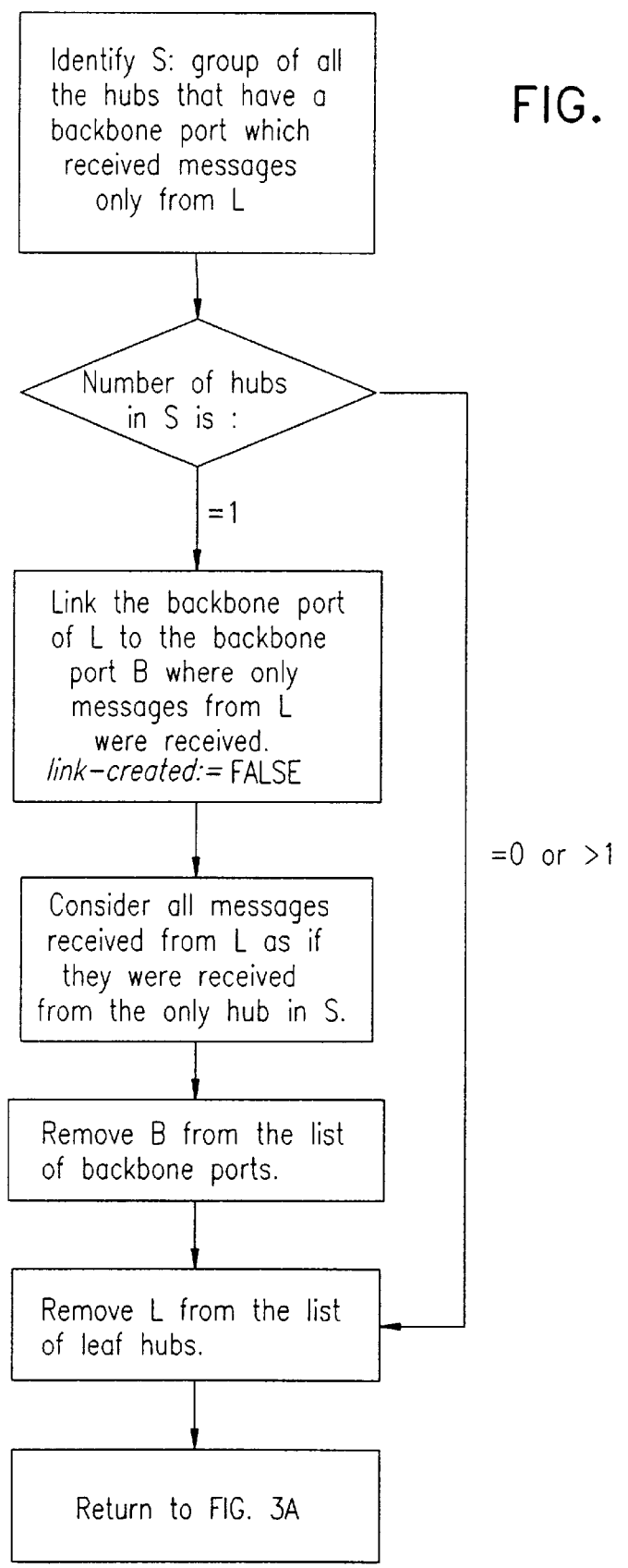
Figure 4:
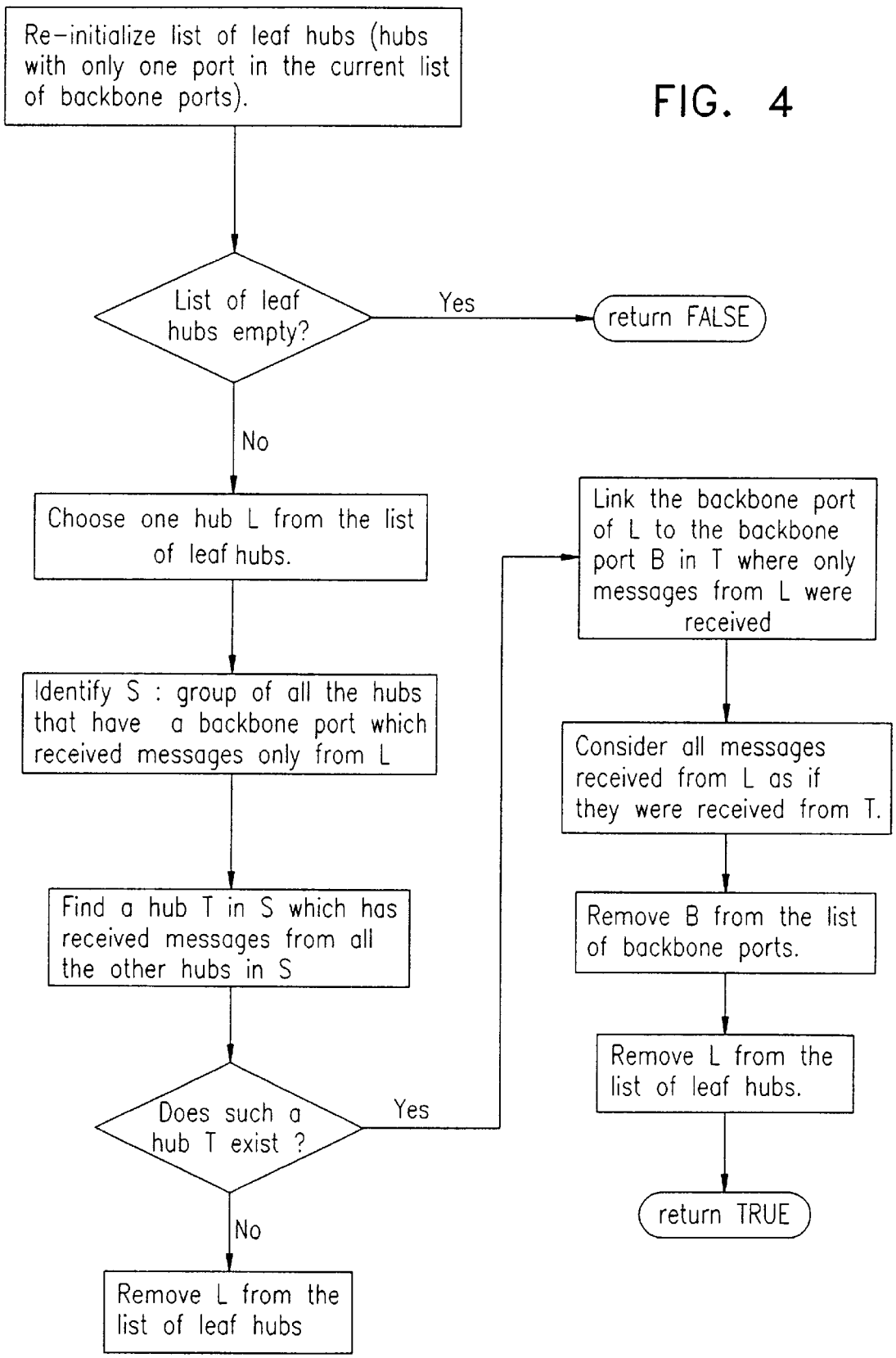
FIG. 4 is a simplified flowchart illustration of the supplementary network layout computing block of FIG. 2.

The Console performs a "Passive" network layout discovery procedure such as that described in FIGS. 3A–3B, 4 based on the CAM list associated with the backbone ports.

For the cases of "none-CAM supported backbone", the Console uses the NMA-RS monitoring feature to have the association between MAC address to port, as described in FIGS. 3A–3B.

4.2.2.2. Console Activities 1. lse404s Case

If there are, in the same HUB, two or more segmented switch modules functioning as a backbone between switch HUBs, the console gets their CAM (of the backbone port) and tries to find the neighbor Agents in the CAM. Thus it tells the console the exact module and port connection between switch HUBs. This is done for Segmented switch modules (404s, etc.).

2. "Non-CAM Supported Backbone" Case

If in there are in the hub more than one "non-CAM supported backbone", and if the Agent is not NMA-RS, then the Console fails to discover the Switch network layout. Otherwise, if there is an NMA-RS, the console sets MIB item topDiscoveryTimeOut, to 5 minutes and the MIB item ethTopHSBMonitor to startMonitor(2). The Console can get the IsHostTimePortCorrTable when the Agents are still in startMonitor(2) mode and haven't reach the timeout.

Then the Console looks for backbone ports in the table and prepare a list of Hosts (MAC) for each backbone port. When the Console had built such list per backbone port, it can use the procedure defined for 404s case 3. LSF-100 Case If the backbone is LSF-100, the Console gets the smartLSFTable table, and find which LSF-100's are members of the same FDDI ring.

Figure 10:
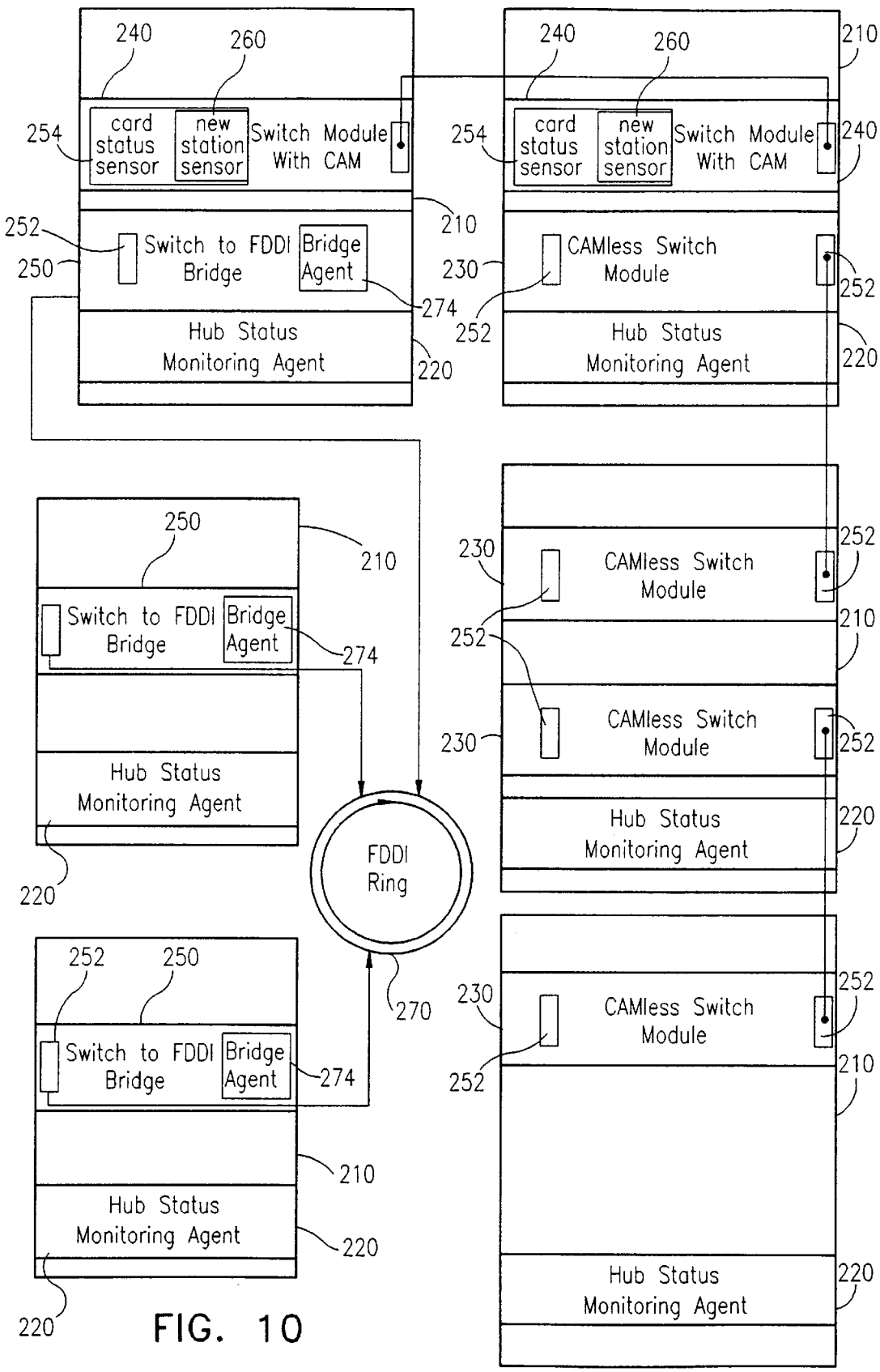
FIG. 10 is an example of a switched network including 3 types of backbone connections.

Preferably, collecting network layout information includes determining which end-station addresses passed through which ports, either by performing RMON switch monitoring and/or by collecting information from each port regarding end-stations which communicate via that port. Alternatively or in addition, if the network comprises an FDDI (fiber distributed data interface) ring, as illustrated in FIG. 10, the end-stations which communicate via each of a particular switching hub's backbone ports are identified by determining which switches are connected to the FDDI ring.

The information gathered by unit 110 is also stored in database 60.

The network layout detector 120 is operative to detect the layout of the network based on all of the information gathered by units 80, 90, 100 and 110 and stored in database 60. A preferred method for network layout detection, for networks or network portions lacking an FDDI ring is described below with reference to FIGS. 3A–4. If a network or network portion includes an FDDI ring, the position of the FDDI ring within the network may be detected by unit 110, using information generated by switching hub-FDDI bridge card agents, as described in detail below with reference to FIG. 10.

A shared-switched connection detector 130 is operative to detect the locations of all connections between shared network portions and switched network portions, also termed herein "switch clouds", within the network. The detector 130 is operative for networks which are mixed and is described in detail below with reference to FIG. 5.

FIGS. 3A–3B, taken together, form a simplified self-explanatory flowchart illustration of a preferred method of operation for the network layout detector block 120 of FIG. 2.

FIG. 4 is a simplified self-explanatory flowchart illustration of the supplementary network layout computing block 200 of FIG. 3A.

Figure 5:
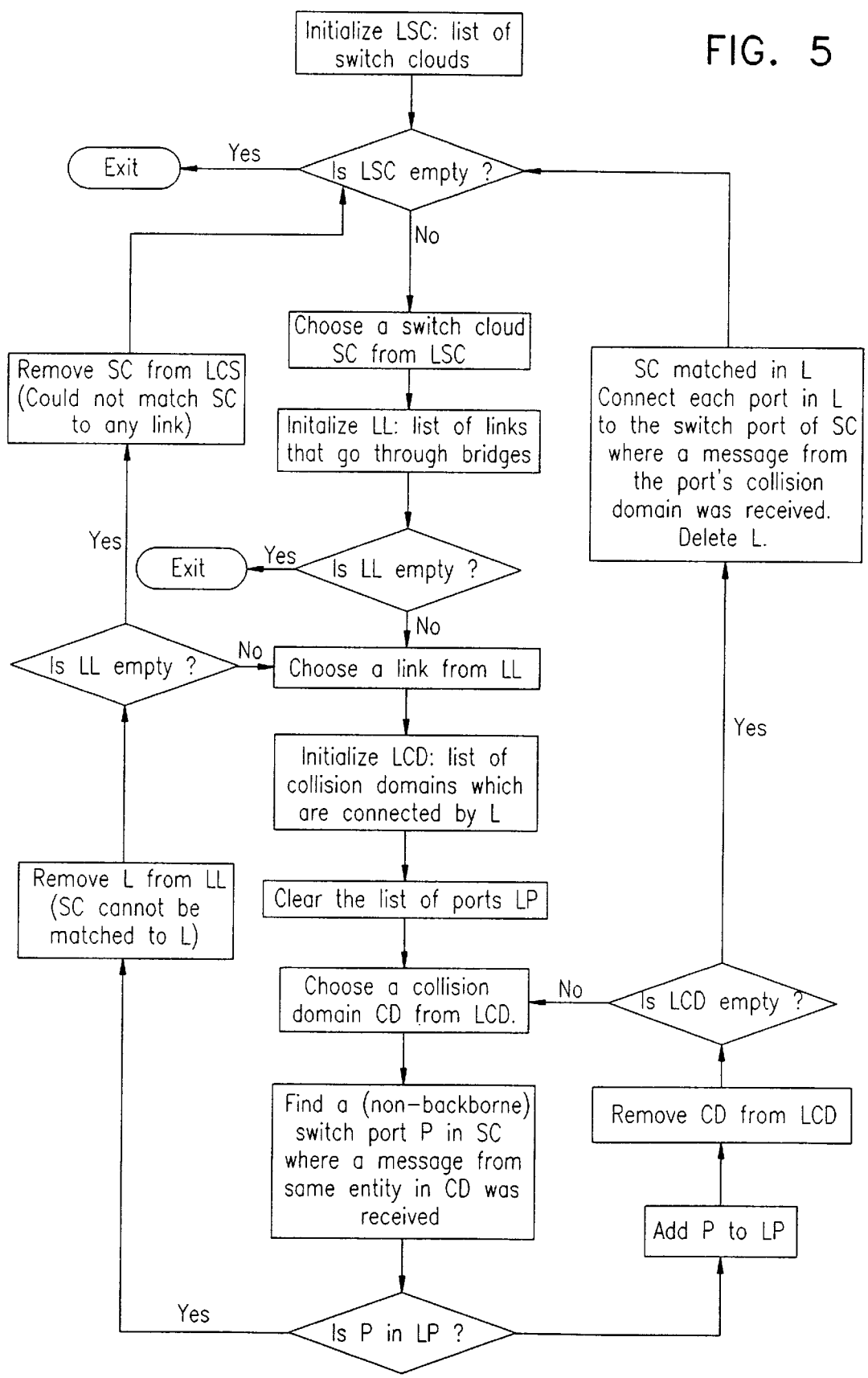
FIG. 5 is a simplified self-explanatory flowchart illustration of a preferred method of operation for the shared-switched connection detector of FIG. 2.

FIG. 5 is a simplified self-explanatory flowchart illustration of a preferred method of operation for the shared-switched connection detector 130 of FIG. 2.

Preferably, the network is initially viewed as a shared network having a plurality of known bridge locations which are referred to in FIG. 5 as the LL (list of links that go through bridges). It is also known, using the method of FIGS. 3A–3B, that the network includes a plurality of switch clouds, referred to in FIG. 5 as the LSC (list of switch clouds). The method of FIG. 5 finds, for each switch cloud in LSC, the bridge location in the LL which corresponds to that switch cloud.

LL, the list of links which go through bridges, may be generated using methods similar to the above-described method employed by bridge location identifier 100.

Figure 6:
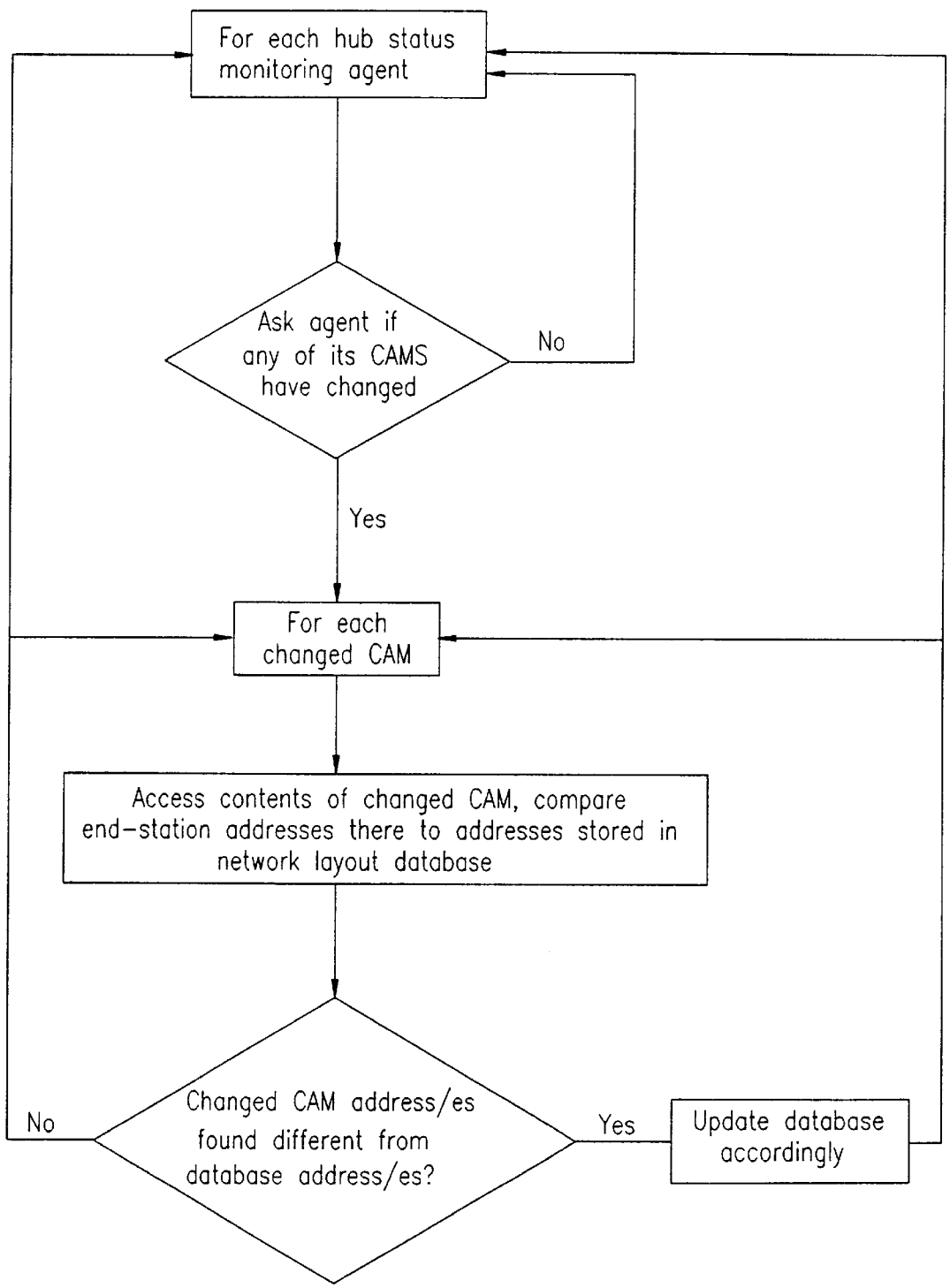
FIG. 6 is a simplified flowchart illustration of a preferred mode of operation of the background network layout updater of FIG. 1.

Reference is now made to FIG. 6 which is a simplified flowchart illustration of a preferred mode of operation of the background network layout updater 50. Network layout updater 50 is preferably operative to periodically ask each hub status monitoring agent whether or not a change has taken place in one of its CAMs. If so, the contents of that CAM are accessed by the background network layout updater and the end-station addresses stored there are compared to the end-station addresses stored in the database 60 to determine which of the end-stations whose addresses are stored in that CAM have moved since the network layout was identified, i.e. since the database 60 was last updated. The database 60 is then updated to reflect the new location/s of the end-station/s that is or are found to have moved or been added.

Figure 7:
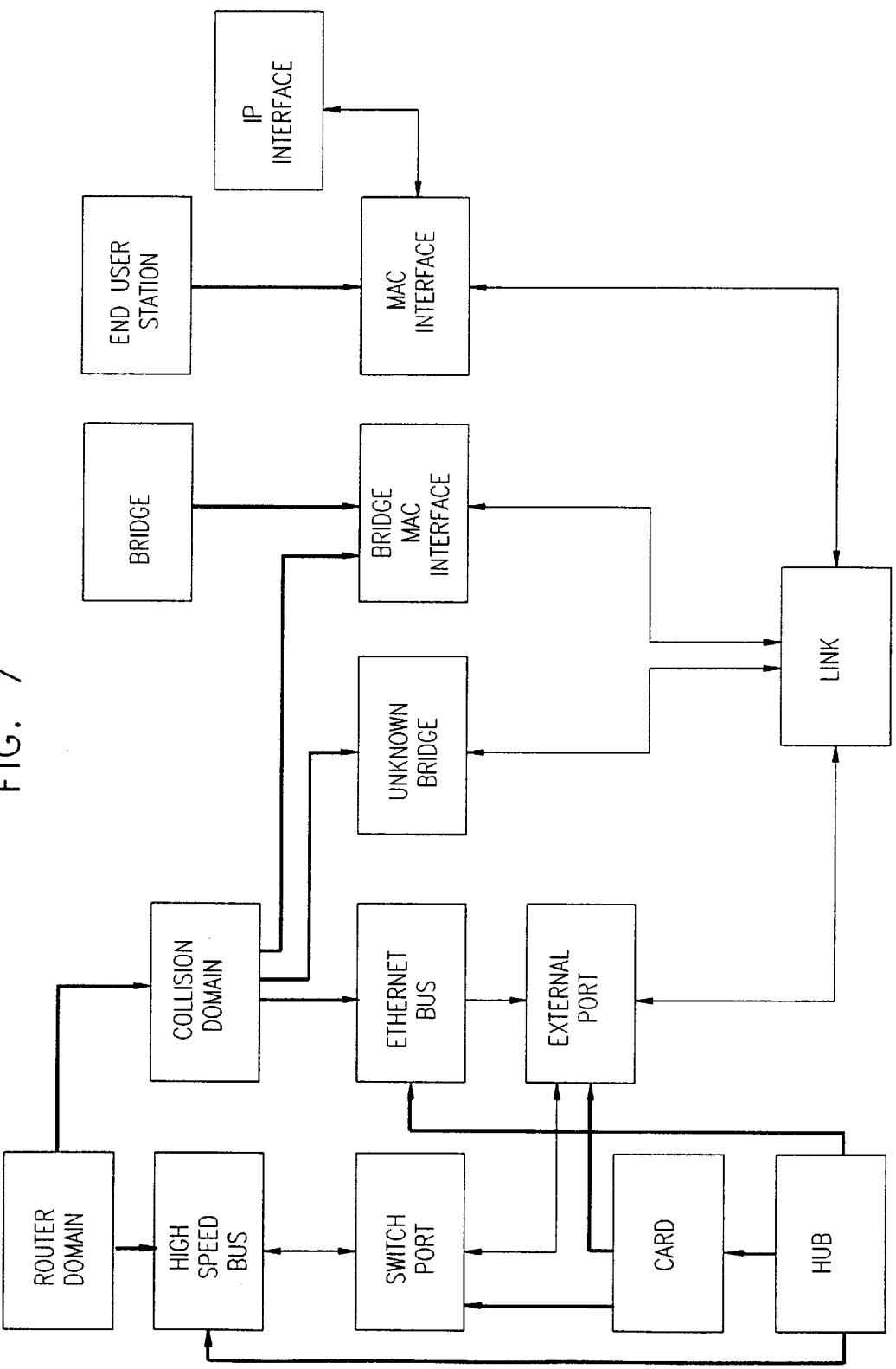
FIG. 7 is a block diagram illustration of the scheme of the network layout database of FIG. 1.

FIG. 7 is a simplified block diagram illustration of the scheme of the network layout database 60 of FIG. 1. A boldface arrow represents that the element at the tip of the arrow is included in or contained in the element at the base of the arrow. A bi-directional arrow indicates presence of a data communication link between two elements.

Preferably, the database 60 of FIG. 1 which represents the layout of a network comprises a computerized representation of a plurality of elements included in a network, as described above, and a plurality of element keys, also termed herein element coordinates, associated respectively with the plurality of elements. Each element key indicates a location of the corresponding element within the computerized representation and a location of the corresponding element within the network.

Additional element-specific information, such as status information or definition of type, may be stored in the database 60 regarding some or all of the elements illustrated in FIG. 7.

For example, the database 60 may type information regarding each card such as the card's name.

FIG. 10 is an example of the backbone of a switched network including 3 types of backbone connections. As shown, the network of FIG. 10 includes a plurality of hubs 210 each including a hub status monitoring agent 220, one or more switching cards including, in the present embodiment, three types of backbone switching cards 230, 240, and 250. In other words, all ports 252 of all of the cards connect to other ports rather than to end-stations. Each card includes, apart from a plurality of ports 252, a card status sensor 254 which comprises a new end-station sensor 260. The new end-station sensor 260 is operative to sense when a new end-station is first connected to one or the ports 252 of its card.

In the embodiment of FIG. 10, the three types of cards include CAMless cards 230 (i.e. cards which do not include content addressable memory), CAM-containing cards 240, i.e. cards which do include content addressable memory and FDDI ring-connected cards 250 which are connected to an FDDI ring 270. The CAM in each individual CAM-containing card 240 is operative to store addresses of stations which transmitted information via that CAM-containing card.

The hub status monitoring present, for example, use the SNMP protocol and may present this information in MIB format. An example of a hub status monitoring agent is described in copending U.S. patent application Ser. No. 08/623,324, the disclosure of which is hereby incorporated by reference.

Each switching hub-FDDI bridge card 250 includes an agent 274 which typically includes information identifying all other switching hub-FDDI bridge cards which are associated with the same FDDI ring 270. This information is accessible via the MIB (management information base) of each of the agents 274. The MIB may be as follows:

```
smartLSFTable OBJECT-TYPE
        SYNTAX SEQUENCE OF SmartLSFEntry
        ACCESS not-accessible
        STATUS mandatory
        DESCRIPTION
        "This table contains the MAC addresses of all LSF100
    modules on the FDDI ring.
    This information is needed for LANNET Topology application."
        ::= { smartLSFddi 1 }
smartLSFEntry OBJECT-TYPE
        SYNTAX SmartLSFEntry
        ACCESS not-accessible
        STATUS mandatory
        DESCRIPTION
            "A table entry containing MAC addresses of all LSF100
modules on the FDDI ring."
        INDEX { smartLSFMACAddr }
        ::= { smartLSFTable 1 }
SmartLSFEntry ::=
        SEQUENCE {
        smartLSFMACAddr
            OCTET STRING,
        smartLSFEntryStatus
            INTEGER
}
smartLSFMACAddr OBJECT-TYPE
    SYNTAX OCTET STRING
    ACCESS read-only
    STATUS mandatory
    DESCRIPTION
    "This item defines the MAC address
    of an LSF100 connected to the FDDI ring."
    ::= { smartLSFEntry 1 }
smartLSFEntryStatus OBJECT-TYPE
    SYNTAX      INTEGER {
                active(1),
                notInService(2),
                notReady(3),
                createAndWait(4),
                destroy(5)
        }
    ACCESS      read-only
    STATUS      mandatory
    DESCRIPTION
    "Only the status active(1) is relevant to this table."
    ::= { smartLSFEntry 2 }
```

Figure 11:
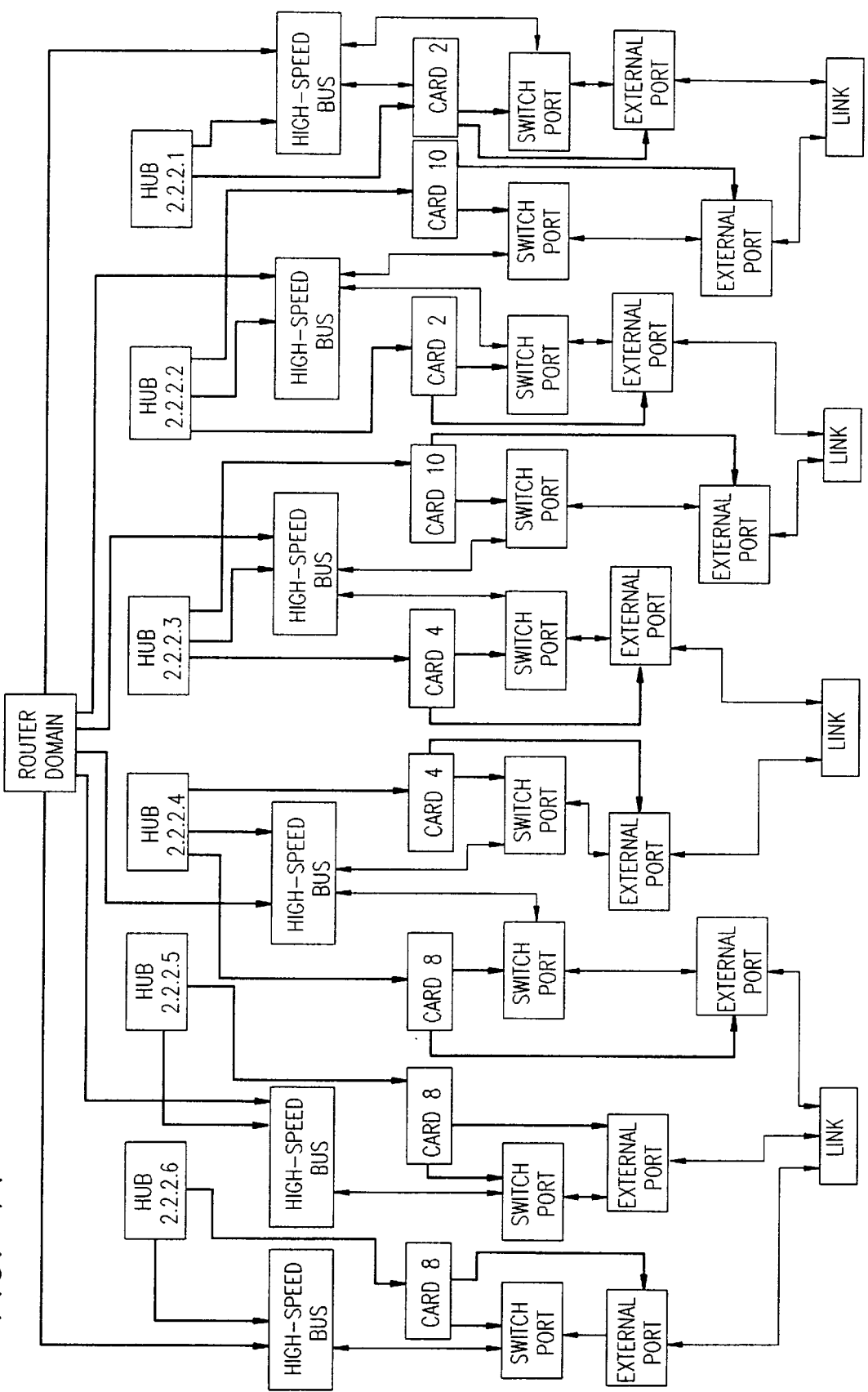
FIG. 11 is a schematic illustration of a representation of the network of FIG. 10 in the network layout database.

FIG. 11 is a schematic illustration of a representation of the network of FIG. 10 in the network layout database 60 of FIG. 7. The bold-face and bi-directional arrow notation is the same as in FIG. 7.

Figure 12:
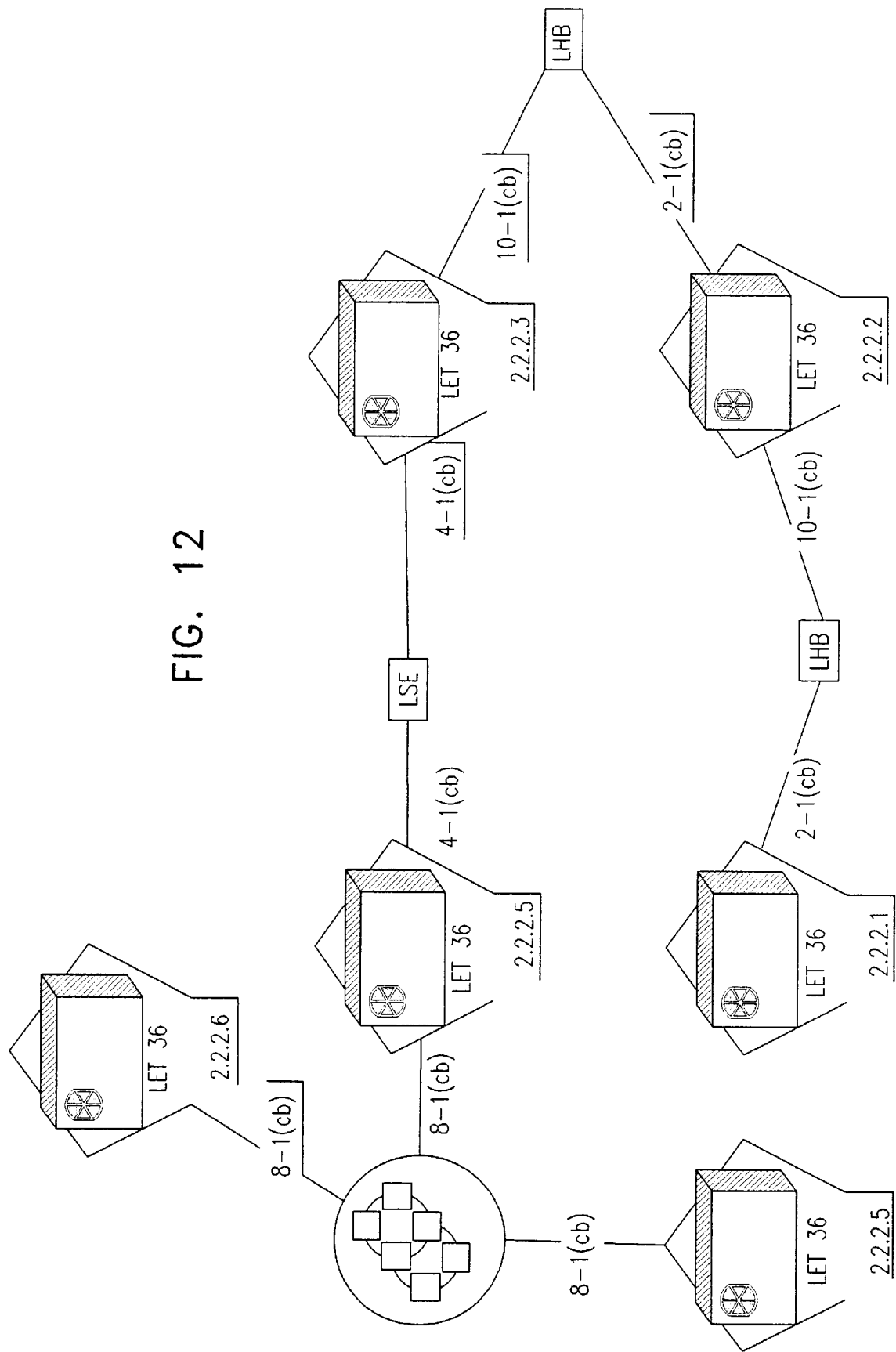
FIG. 12 is an illustration of a representation of the network of FIG. 10 as displayed on the network layout display unit of FIG. 1.

FIG. 12 is an illustration of a representation of the network of FIG. 10 as displayed on the network layout display unit of FIG. 1.

FIG. 13 is an example of a mixed network. Ethernet modules 280 appear in FIG. 13 and do not appear in FIG. 10. The switch modules of FIG. 13 include non-backbone switch modules 290 and backbone switch modules 300. Switches connect to the Ethernet via non-backbone switch modules. A single hub may include zero, one or more switch modules and/or zero, one or more Ethernet modules. Each non-backbone switch module 290 preferably comprises a content-addressable memory (CAM) 310 which stores the addresses of the end stations to which the non-backbone switch module 290 is connected.

Figure 14:
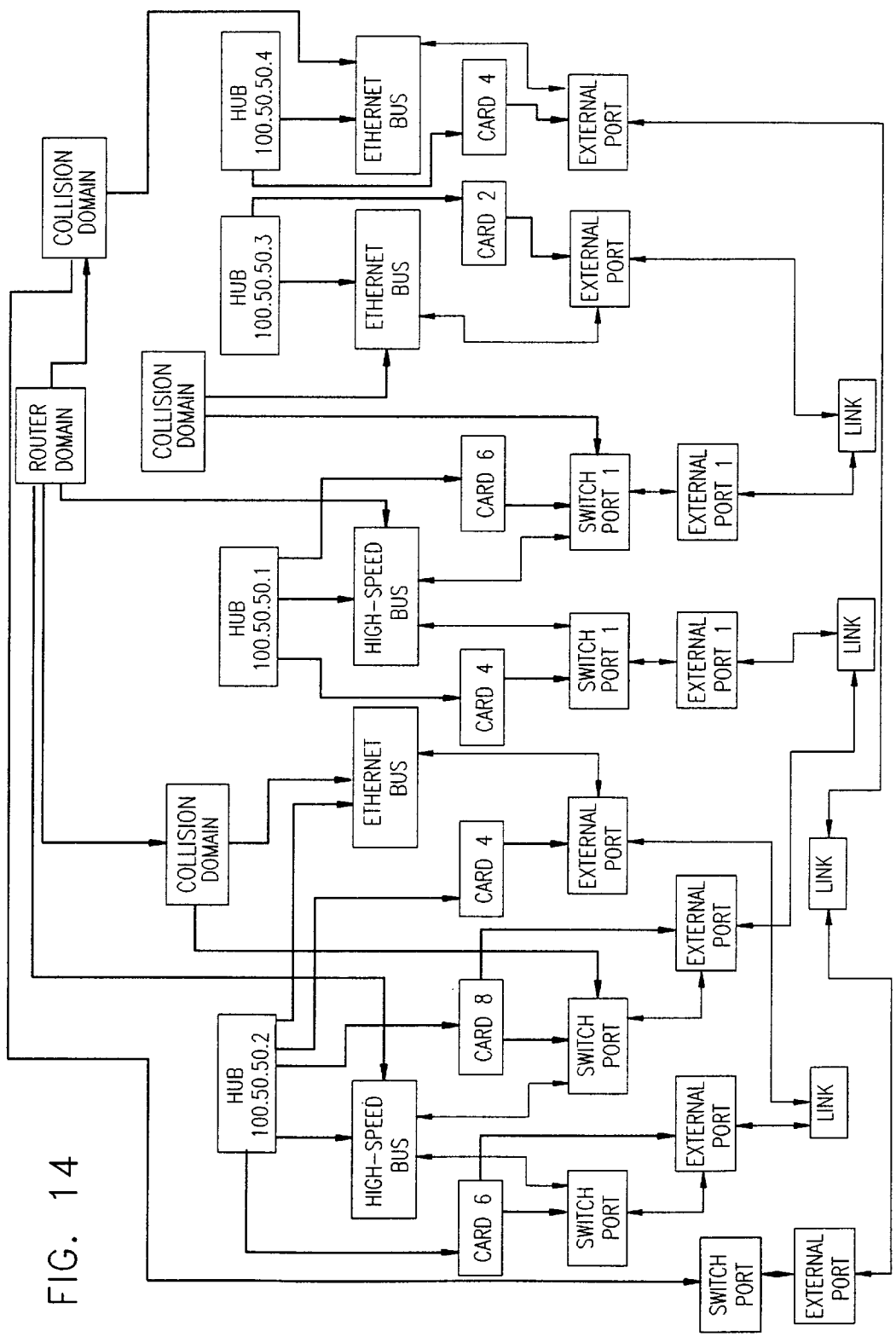
FIG. 14 is a schematic illustration of a representation of the network of FIG. 13 in the network layout database.

FIG. 14 is a schematic illustration of a representation of the network of FIG. 13 in the network layout database 60 of FIG. 7. The bold-face and bi-directional arrow notation is the same as in FIG. 7.

Figure 15:
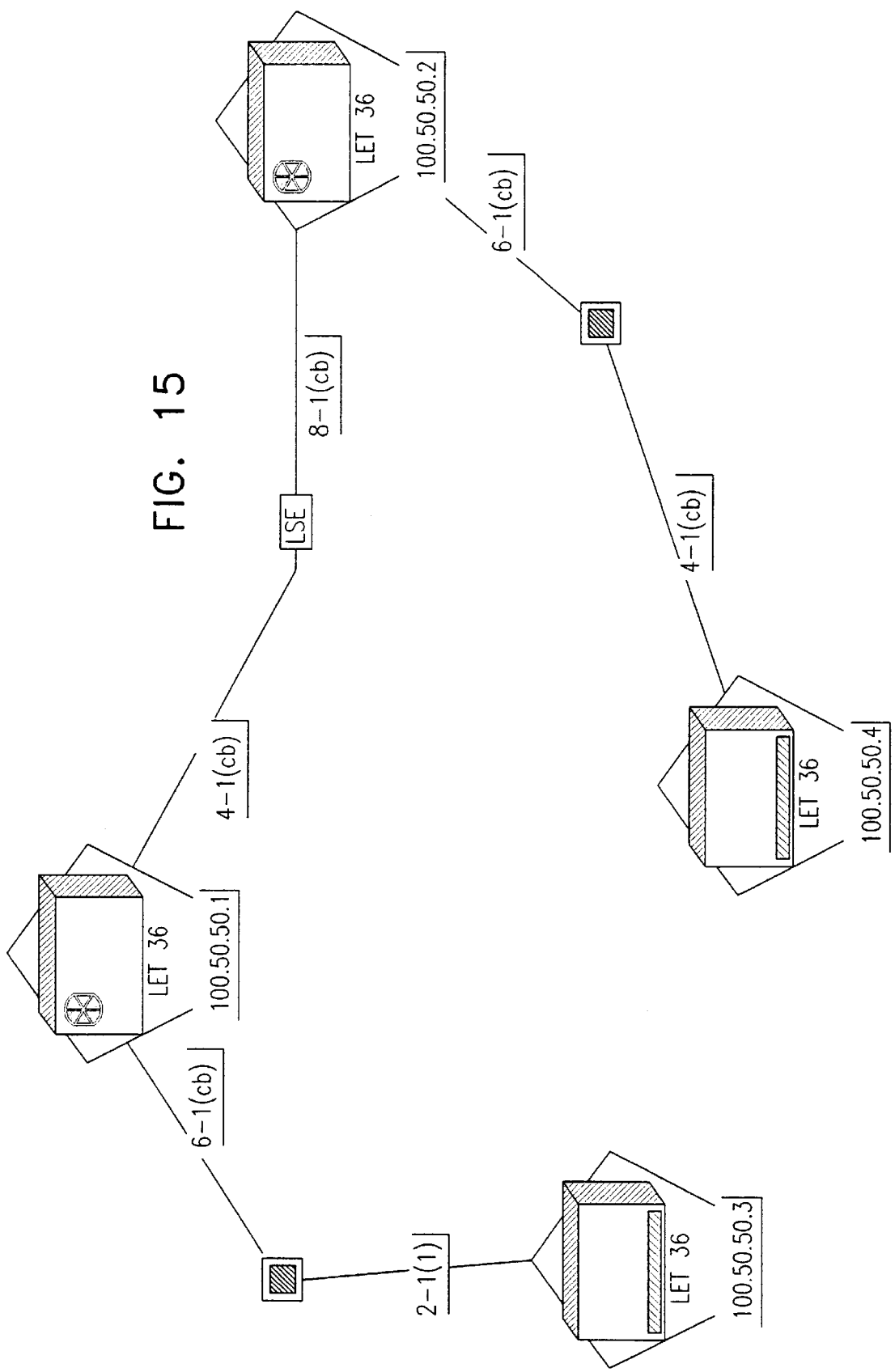
FIG. 15 is an illustration of a representation of the network of FIG. 13 as displayed on the network layout display unit of FIG. 1.

FIG. 15 is an illustration of a representation of the network of FIG. 13 as displayed on the network layout display unit of FIG. 1.

Figure 16A:
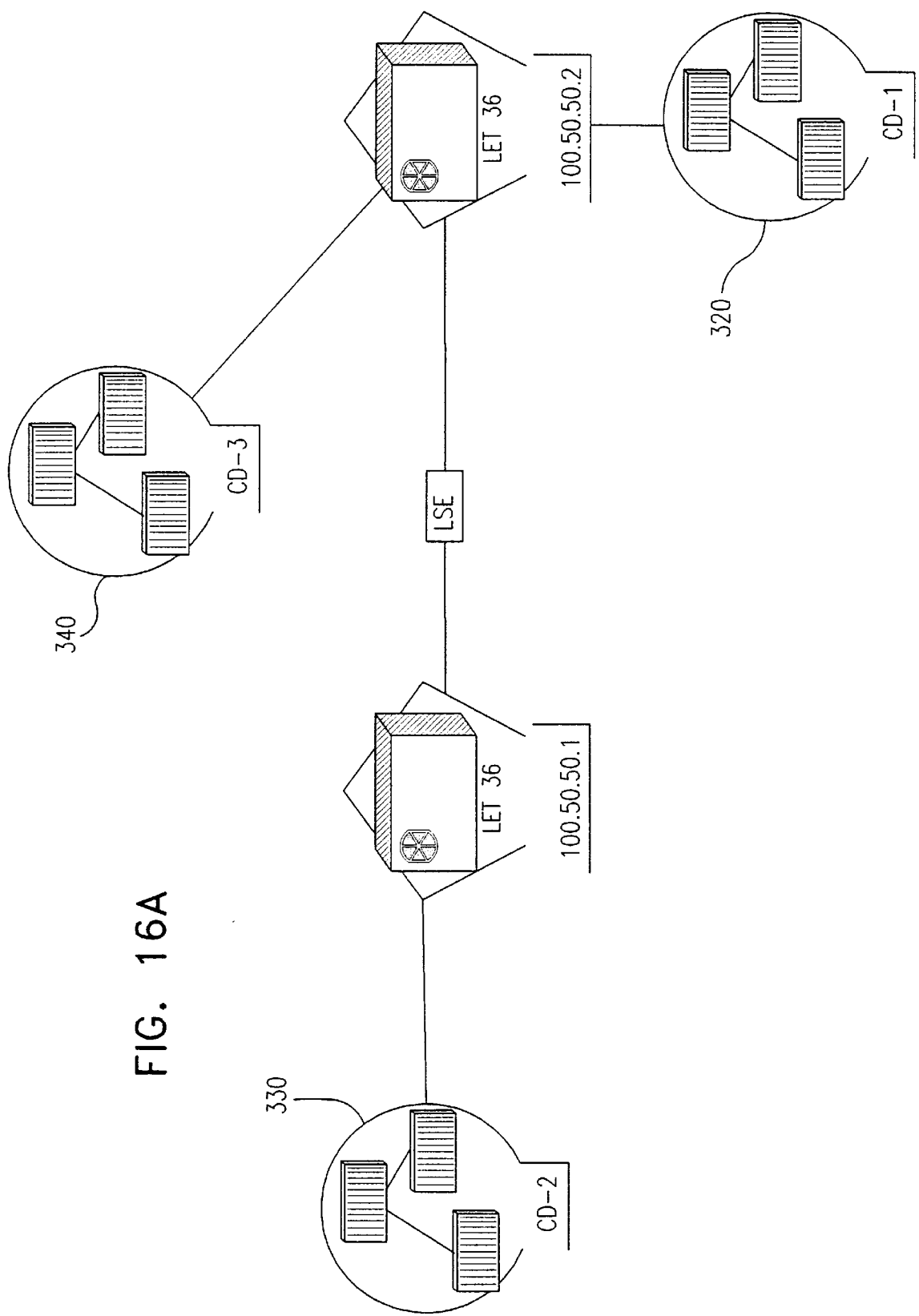
FIGS. 16A and 16B are illustrations of a hierarchical representation of a mixed network as displayed on the network layout display unit of FIG. 1.
Figure 16B:
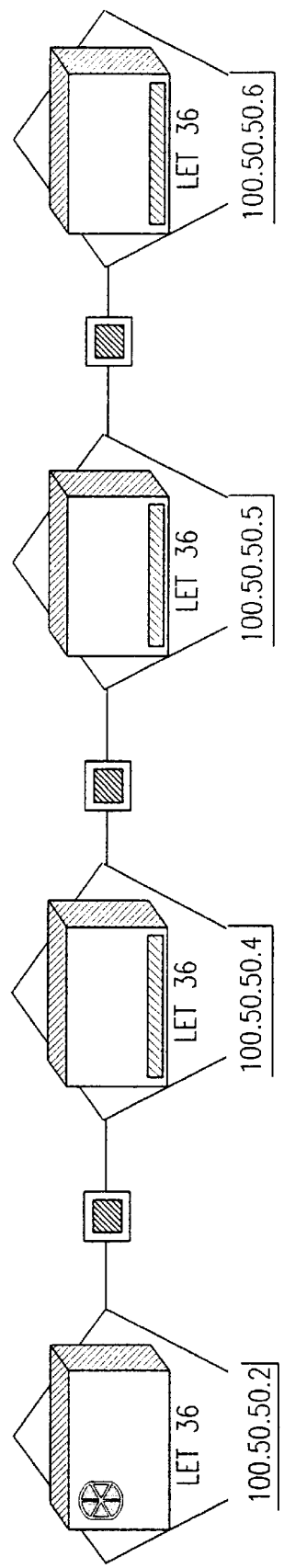

FIGS. 16A and 16B are illustrations of a hierarchical representation of a mixed network as displayed on the network layout display unit of FIG. 1. FIG. 16A illustrates the top level of the mixed network, including 3 collision domains 320, 330 and 340. Each of the collision domains comprises a bridgeless portion of an Ethernet network bounded by bridges or switches such as the Ethernet portion illustrated in FIG. 16B which belongs to the bottom level of the hierarchical representation and includes an illustration of collision domain 320 of FIG. 16A.

Figure 17:
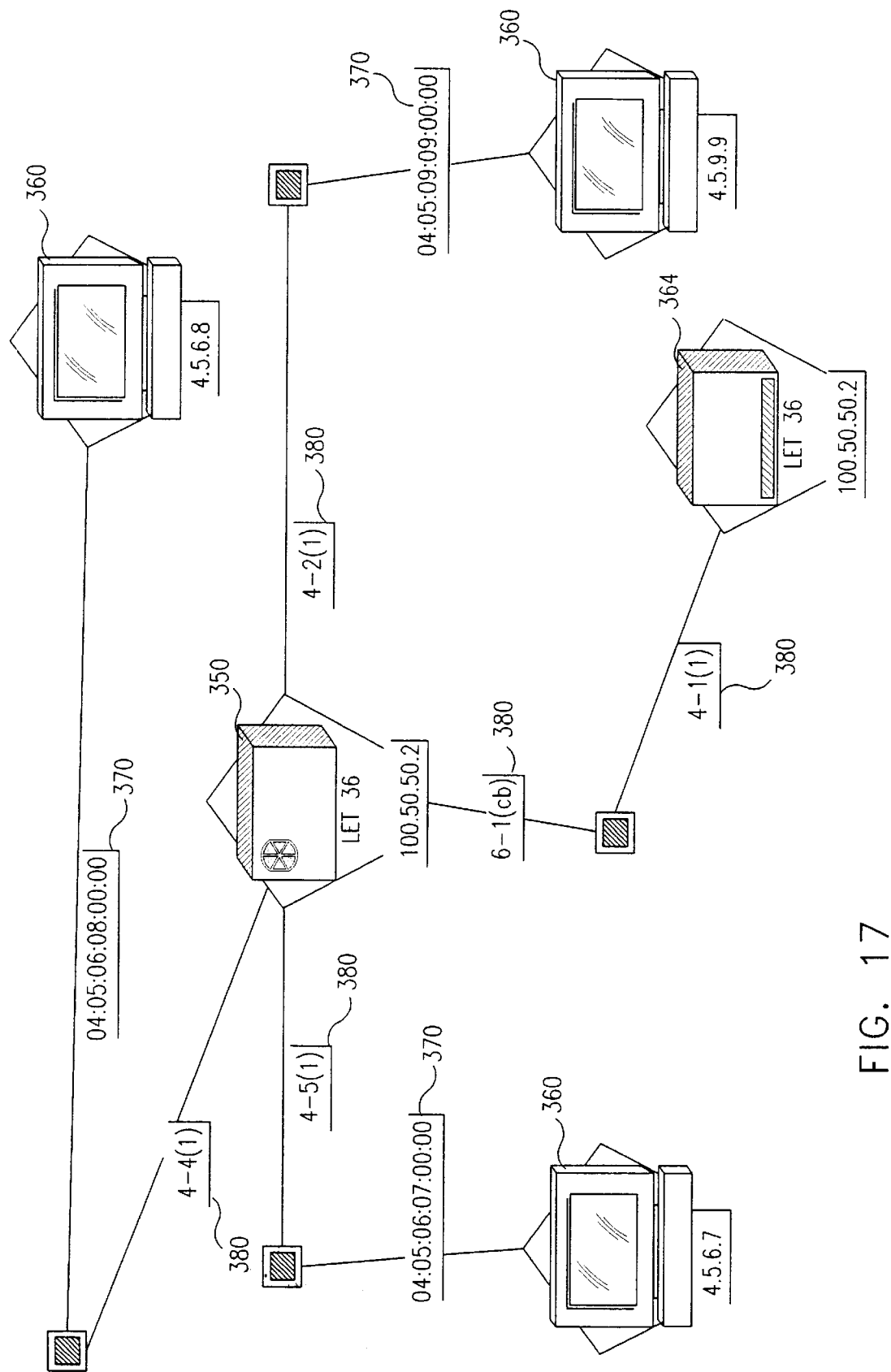
FIG. 17 is an illustration of a "hub-centric" view of a network as displayed on the network layout display unit of FIG. 1.

FIG. 17 is an illustration of a "hub-centric" view of a network as displayed on the network layout display unit of FIG. 1. FIG. 17 illustrates all network elements which are connected to a user-designated hub 350 which in the illustrated example comprise 4 elements, namely 3 end-stations 360 and an Ethernet hub 364. The labels 370 are addresses of the end-stations' network interfaces. The hub labels 380 indicate the card slot, port, and bus within the hub to which a particular network element is connected.

Figure 18:
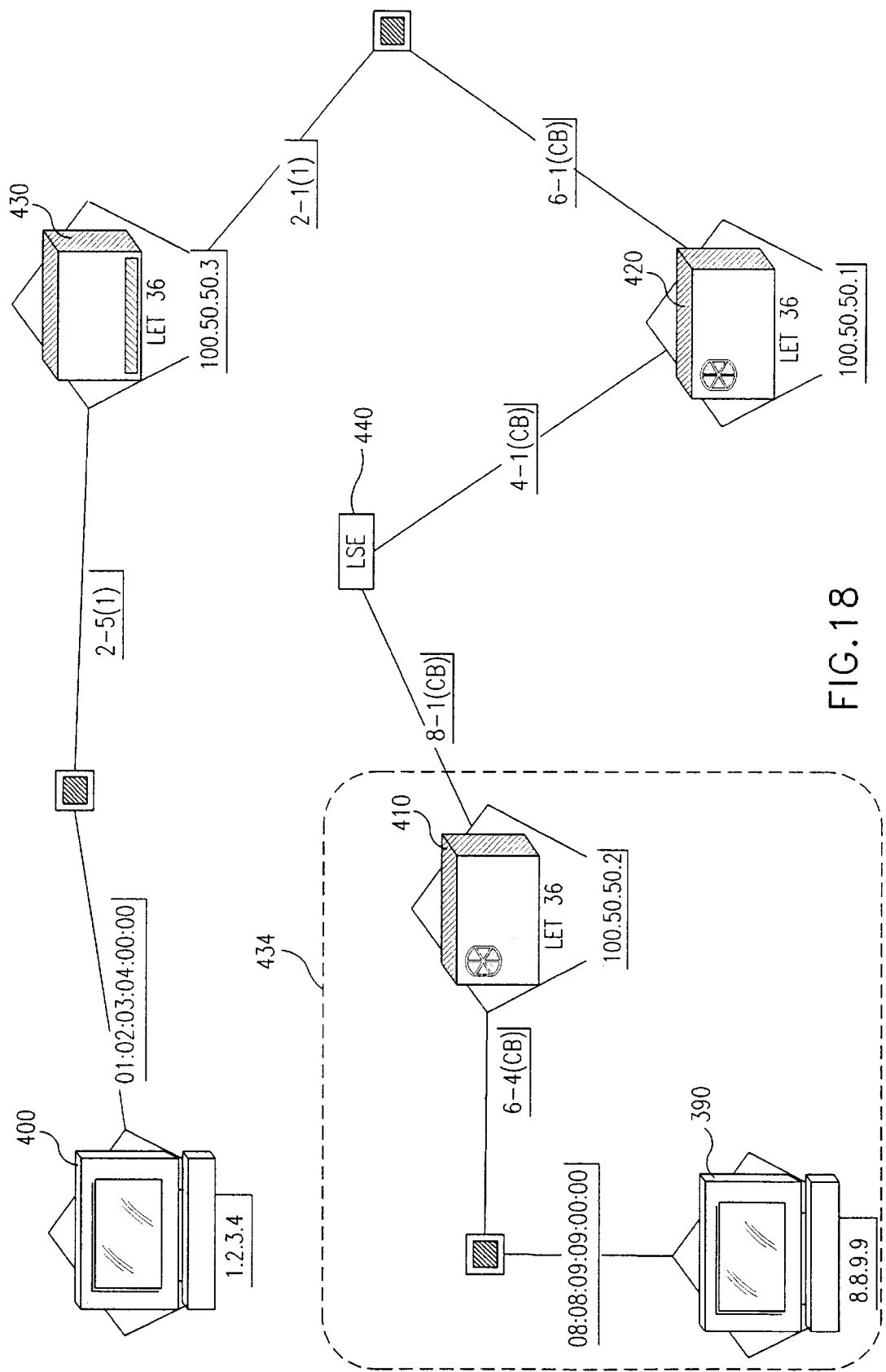
FIG. 18 is an illustration, as displayed on the network layout display unit of FIG. 1, of a representation of a LAN path which connected two user-selected network elements 390 and 400.

FIG. 18 is an illustration, as displayed on the network layout display unit 70 of FIG. 1, of a representation of a path, including one or more hubs, bridges and/or routers, which connects two user-selected network elements 390 and 400. In the illustrated embodiment, a user has requested a display of the path connecting network element 390, which is an end-station, to network element 400, which is also an end-station. The path, as shown, passes via two switching hubs 410 and 420 and an Ethernet hub 430. Preferably, switching hub-to-switching hub connections bear labels 440 which indicate the type of switching hub-to-switching hub connection, such as an LSE-404s connection, commercially available from Madge Networks Ltd.

According to one possible option, the user is prompted to select a single end-station and the path displayed in response is the path connecting that end-station to the hub within the network which is nearest to said individual end-station. For example, if the user selects end-station 390 in FIG. 18, only the portion of FIG. 18 which is indicated by a dotted line 434 is shown.

The system preferably is operative to accept a user's characterization of each element by means of any of the following characterizing information items: the element's MAC address, IP address or host name.

Figure 19:
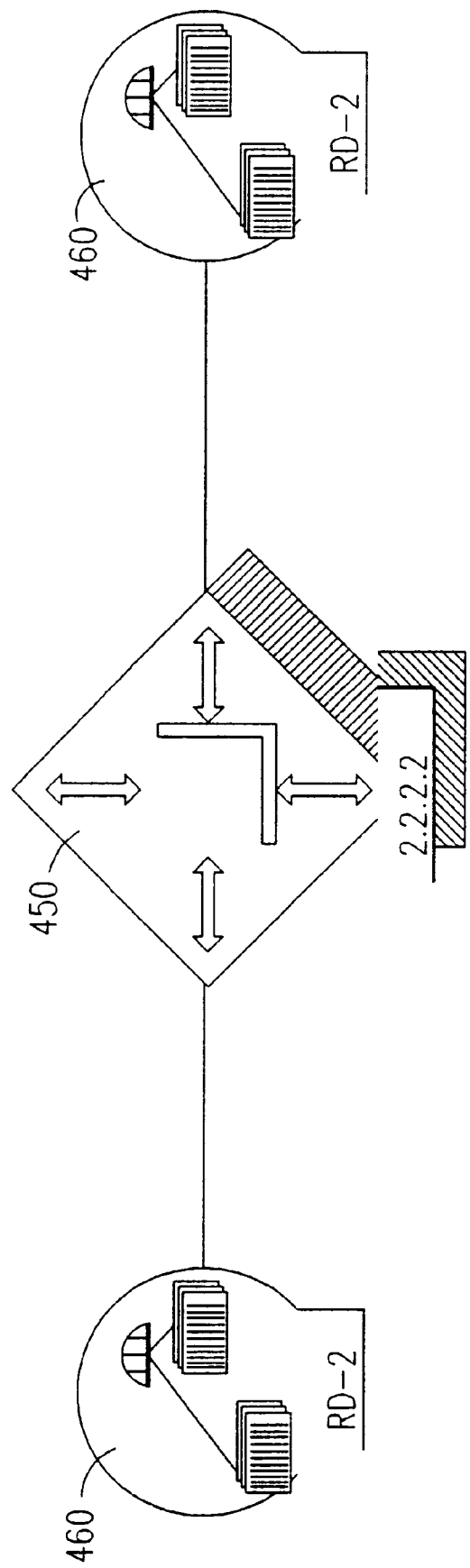
FIG. 19 is an illustration, as displayed on the network layout display unit of FIG. 1, of a hierarchically displayed layout of a network.

FIG. 19 is an illustration, as displayed on the network layout display unit 70 of FIG. 1, of a hierarchically displayed layout of a network including a multiplicity of elements.

According to a preferred embodiment of the present invention, a network may be displayed by:

a. displaying a first level representation of the network including a first plurality of icons which is equal or less in number than the multiplicity of elements included in the network, wherein at least one of the icons represents a subset of at least one element from among said multiplicity of elements; and b. for each of the at least one subsets, subsequently displaying a second plurality of icons representing the subset.

FIG. 19 is an example of a display generated by step (a). The display of FIG. 19 includes a single first-type icon 450, although more generally, any number of first-type icons may appear. Each first-type icon represents a router. The display of FIG. 19 also includes one or more second-type icons 460 (two second-type icons 460 in the present example) which represent routerless network portions which do not include any routers and which are bounded by routers.

The display generated by step (b) for the RD-1 element 460 of FIG. 19 may, for example, comprise FIG. 16A. The display generated by step (b) for the RD-2 element 460 of FIG. 19 may, for example, be similar to FIG. 16A except that the IP addresses of the hubs are different.

Appendix A is a set of computer listings which together form a preferred software implementation of the network layout identifying system 20 of FIG. 1.

A preferred method for generating a network layout identifying system using the computer listings of Appendix A is as follows:

a. Install the following commercially available equipment, as explained in the respective installation guides:

Madge hub or hubs with switch modules, such as an LET-36, LET-18E, LET-10 or LET-20, all commercially available from Madge Networks Ltd., Atidim Technological Park, Building 3, Tel Aviv 61131;

a Madge management module (agent card) for each hub, such as an NMA-II, NMA-E, E, NMA-RE, NMA-RS. For a hub which has an LHB backbone module, an NMA-RS agent card must be used;

Madge management agent software, version 7.1 or higher;

a UNIX workstation with at least 64 MB of RAM and 1 GB of hard disk, plus a UNIX operating system, such as the Sparc, commercially available from Sun Microsystems, HP/UX, commercially available from Hewlett-Packard, or RS6000, commercially available from IBM;

ObjectStore database, marketed by Object Design, Inc., 25 Burlington Mall Road, Burlington, MA 01803, USA.

an HP OpenView or IBM NetView/6000 management platform; and

MultiMan/OV network management console software, version 3.1 at least, for Solaris, HPUX or AIX, for installation in the UNIX workstation.

b. Generate a digital file from each of the listings of Appendix A, by typing the source code of the listing on the workstation, using conventional text editors such as vi or emacs. Name each file as indicated at the top of each listing.

c. Compile the source code with the workstations native C++ compiler and link all modules together using the native linker.

d. Install the resulting executables, in accordance with the installation instructions of Chapter 2 of The User Manual of TerrainMaster Version 1.0, commercially available from Madge Networks, San Jose, Calif., USA.

e. Run the software, by using the The User Manual of TerrainMaster Version 1.0, commercially available from Madge Networks, San Jose, Calif., USA.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A method for detecting a layout of a switched local network including at least one switching hub connected to a first plurality of elements, each identified by an address, via a corresponding second plurality of ports defining a corresponding second plurality of element to port connections, the method comprising:

determining all element to port connections;

for each switching hub, identifying the elements which communicate via each of that switching hub's backbone ports; and based on said element to port connections and said elements communicating via each switching hub's backbone ports, determining the layout of the switched local network, wherein each of said steps of determining and identifying comprises, for each switching hub, the step of performing RMON switching hub monitoring.

2. A method according to claim 1 wherein said step of determining all end-station to port connections comprises collecting information from each said port regarding end-stations which communicate via that port.

3. A method according to claim I wherein said switched network comprises an FDDI (fiber distributed data interface) ring and wherein said step of identifying comprises the step of determining which switches are connected to said FDDI ring.

4. A method for detecting a layout of a switched local network including at least one switching hubs connected to a plurality of end-stations via a corresponding plurality of ports defining a corresponding plurality of end-station to port connections, the method comprising:

categorizing each of said at least one switching hubs as leaf hubs, which are each linked to only one port of only one other hub, or as non-leaf hubs; and for each leaf hub, determining leaf hub information which comprises the single port of the single hub to which the leaf hub is linked; and employing said leaf hub information in order to determine the layout of the non-leaf hubs in the switched local network.

5. A method according to claim 4 wherein said step of determining the single port of the single hub to which a leaf hub is linked comprises:

scanning all backbone ports in each of the hubs of the switched local network other than said leaf hub to determine which hubs received at least one message from said leaf hub and received no messages from any other hub; and if only a single backbone port is found which received at least one message from said leaf hub and received no messages from any other hub, identifying the single backbone port as the port to which the leaf hub is linked.

6. A method according to claim 5 and also comprising:

if a plurality of backbone ports is found, each of which received at least one message from said leaf hub and from no other hub, performing the following steps:

scanning the plurality of hubs corresponding to said backbone ports in order to identify a hub which received at least one message from each of the other hubs from among said plurality of hubs, and identifying the backbone port corresponding to said hub as the port to which the leaf hub is linked.

7. A method for detecting a layout of an at least partly switched local network including at least one switching hub connected to a first plurality of end-stations via a second plurality of ports defining a corresponding second plurality of end-station to port connections, the method comprising:

for each switching hub, identifying the end-stations which communicate via said switching hub; and identifying the switches which are connected to said switching hub.

8. A method according to claim 4 wherein said employing step comprises repeating said categorizing and determining steps wherein, for each repetition, the end-stations connected to each leaf hub are treated as though they were end-stations connected to the hub to which the leaf hub is linked.

9. A method according to claim 7 wherein said at least partly switched local network comprises a plurality of network portions, at least one of said plurality of network portions comprising a shared local network and at least one of said plurality of network portions comprising a switched local network, and wherein said method also comprises the step of determining a connection structure between all of said network portions.

10. Apparatus for monitoring a layout of a local network, the network including a first plurality of ports associated, via end-station to port connections, with a second plurality of end-stations, the apparatus comprising:

a network layout identifier operative to generate a representation of the layout of the network; and a network layout updater operative to update said representation if only a portion of the layout of the network changes.

11. Apparatus according to claim 10 wherein the portion of the layout which changes comprises at least one end-station which is moved so as to be connected to a different port.

12. A method for monitoring a layout of a local network, the network including a first plurality of ports associated with one another via at least one port to port connections, and associated, via end-station to port connections, with a second plurality of end-stations, wherein at least one of the port to port connections passes through a bridging element, the method comprising:

determining and storing the layout of the network including identifying all port to port connections; and identifying all port to port connections which include bridges, the identifying step comprising conveying messages which do not pass through bridging elements and identifying ports which did not receive said messages.

13. A method according to claim 12 wherein said bridging element comprises a bridge.

14. A method according to claim 12 wherein said bridging element comprises one of the following:

a bridge; and a switch cloud.

15. A method for identifying addresses of bridges included in port to port connections, each of which connect a pair of ports from among a multiplicity of ports of a network, the method comprising:

providing a plurality of bridge addresses to be matched to said bridges;

monitoring each of said multiplicity of ports for spanning tree messages, each of which includes bridge identification information which identifies a bridge which sent it; and for each spanning tree message, using the bridge identification information to identify the address of the bridge which sent the spanning tree message, from among said plurality of bridge addresses.

16. A method according to claim 15 wherein said step of using comprises, for each spanning tree message:

identifying a pair of subtrees connected by a bridge, whose nodes are bridges and repeaters and whose arcs are bridge-bridge, bridge-repeater and repeater-repeater connection wires, such that the spanning tree message passes through the first subtree and does not pass through the second subtree; and identifying the root of the first subtree as the bridge which sent the spanning tree message.

17. A method for storing a network layout, the method comprising:

storing network layout information in a database; and providing a database management system operative to access said network layout information.

18. A method according to claim 17 wherein said database comprises an object-oriented database.

19. Database apparatus for representing the layout of a network, the apparatus comprising:

a computerized representation of a plurality of elements included in a network;

a computerized representation of data communication links between individual ones of said plurality of elements; and a computerized representation of containment relationships each indicating that a first one of said plurality of elements is included in a second one of said plurality of elements.

20. Apparatus according to claim 19 wherein the computerized representation of the plurality of elements comprises a plurality of object-oriented programming objects.

21. Apparatus according to claim 19 wherein said plurality of elements are of more than one type and said plurality of objects are of more than one class and each type of element is represented by a corresponding class of object.

22. Apparatus according to claim 21 wherein the plurality of elements included in the network are of a first plurality of types of which at least a portion have at least one hierarchy relationships defined therebetween and wherein the plurality of objects are of a first plurality of classes of which at least a portion have at least one inheritance relationships defined therebetween which are respectively analogous to said hierarchy relationships.

23. Apparatus according to claim 22 wherein said hierarchy relationships include at least one of the following:

a hierarchy relationship between different types of ports;

a hierarchy relationship between different kinds of busses; and a hierarchy relationship between different types of interfaces.

24. Database apparatus for representing the layout of a network, the apparatus comprising:

a computerized representation of a plurality of elements included in a network; and a plurality of element keys associated respectively with the plurality of elements, wherein each element key indicates a location of the corresponding element within the computerized representation and a location of the corresponding element within the network.

25. A method for generating a hierarchical display of the layout of a network including a multiplicity of elements, the method comprising:

displaying a first level representation of the network including a first plurality of icons which is less in number than said multiplicity of elements, wherein at least one of the icons represents a subset of more than one elements from among said multiplicity of elements; and for each of the at least one subsets, displaying a second plurality of icons representing the subset.

26. A method according to claim 25 wherein said first plurality of icons includes only first-type icons and second-type icons, wherein said first-type icons represent routers and said second-type icons represent routerless network portions which do not include any routers and which are bounded by routers.

27. A method according to claim 26 wherein said second plurality of icons includes only third-type icons and fourth-type icons, wherein said third-type icons represent bridges and said fourth-type icons represent collision domains wherein each collision domain comprises a bridgeless network portion which does not include any bridges and which is bounded by bridges.

28. A method for generating a display of a network layout, the method comprising:

displaying a first plurality of network elements and a second plurality of connections between individual ones of said first plurality of network elements; and displaying a representation of at least one characteristics of at least one of said second plurality of connections.

29. A method according to claim 28 wherein said at least one connection comprises a connection between a switching hub and at least one other network element and wherein said at least one characteristics displayed comprise an identification of a card slot in which the at least one other network element is installed, an identification of a port of the card to which the network element is connected and an identification of a bus to which the port is connected.

30. A method for managing a network including a plurality of elements including at least one switching hubs, the method comprising:

generating a display of the network including generating at least one hotspots respectively representing at least one switching hubs included in the network;

upon selection of an individual one of the hotspots, activating a switching hub manager which is operative to manage the switching hub corresponding to said individual hotspot.

31. A method for displaying a network layout, the network including a plurality of elements including at least one hubs, the method comprising:

accepting a user's selection of an individual hub from among said at least one hubs;

generating a hub-centric view display of the network including only the individual hub and at least a subset of the elements connected therewith.

32. A method according to claim 31 wherein at least one elements are connected to said individual hub via at least one Ethernet ports and at least one elements are connected to the individual hub via at least one switched ports and wherein said subset of elements displayed in said hub-centric view comprises a user-selected one of the following:

only the elements connected to said individual hub via the Ethernet ports; and only the elements connected to said individual hub via the switched ports.

33. A method according to claim 4, and also comprising:

reading the operational status of each of said end-stations from a network management platform associated with the network; and generating a display of the layout of the network including a display of the operational status of each of said end-stations.

34. A method according to claim 7 and also comprising:

reading the operational status of each of said end-stations from a network management platform associated with the network; and generating a display of the layout of the network including a display of the operational status of each of said end-stations.

35. A method according to claim 12 and also comprising:

reading the operational status of each of said end-stations from a network management platform associated with the network; and generating a display of the layout of the network including a display of the operational status of each of said end-stations.

36. Apparatus according to claim 10 and also comprising:

a network management platform;

an operational status reader operative to read the operational status of each of said stations from the network management platform associated with the network; and generating a display of the layout of the network including a display of the operational status of each of said end-stations.

37. A method according to claim 1 and also comprising reading the operational status of at least one of said elements from a network management platform associated with the network and wherein the display of the layout of the network includes a display of the operational status of at least one of said elements.

38. A method according to claim 25 and also comprising reading the operational status of at least one of said elements from a network management platform associated with the network and wherein the display of the layout of the network includes a display of the operational status of at least one of said elements.

39. A method according to claim 28 and also comprising reading the operational status of at least one of said elements from a network management platform associated with the network and wherein the display of the layout of the network includes a display of the operational status of at least one of said elements.

40. A method according to claim 30 and also comprising reading the operational status of at least one of said elements from a network management platform associated with the network and wherein the display of the layout of the network includes a display of the operational status of at least one of said elements.

41. Network layout display apparatus operative to display a layout of at least a portion of a network including a plurality of elements, each pair of elements from among said plurality of elements being connected by a path including at least one of the following elements: a hub, a bridge and a router, the apparatus comprising:

a user input device operative to prompt a user to select an individual pair of elements from among said plurality of elements; and network portion display apparatus for displaying a representation of said individual pair of elements and the path connecting them.

42. Apparatus according to claim 41 wherein said pair of elements comprises a pair of end-stations.

43. Apparatus according to claim 41 wherein the user input device is operative to prompt a user to select an individual end-station and wherein said network portion display apparatus is operative to display the path connecting said individual end-station to the hub within the network which is nearest to said individual end-station.

44. Apparatus according to claim 41 wherein the user input device is operative to accept a user's characterization of an element which is based on any of the following characterizing information items:

a MAC address of the element;

an IP address of the element; and a host name of the element.

45. A method according to claim 1 wherein at least one of said plurality of elements comprises an end-station.

46. A method according to claim 1 wherein at least one of said plurality of elements comprises a router interface and also comprising the step of identifying router interfaces which belong to a single router.

47. Apparatus for determining the layout of a network including a multiplicity of network elements based on information collected from said plurality of network elements, the apparatus comprising:

a plurality of network element polling devices which operate in parallel to poll the multiplicity of network elements, thereby to collect said information therefrom; and a network layout deriving unit operative to receive said information from said plurality of network element polling devices and to derive the layout of the network therefrom.

48. Apparatus according to claim 47 wherein said plurality of network element polling devices operate off-line.

* * * * *